United States Patent
Buck et al.

(10) Patent No.: US 8,597,825 B2
(45) Date of Patent: Dec. 3, 2013

(54) BATTERY ASSEMBLY INCLUDING BATTERY MODULE WITH WRAP BLANKET BETWEEN MODULE AND ENCAPSULATING SOLUTION

(75) Inventors: Derrick S. Buck, Pendleton, IN (US);
Robert N. Fattig, Anderson, IN (US);
Bruce J. Silk, Indianapolis, IN (US)

(73) Assignee: Enerdel, Inc., Greenfield, IN (US)

( * ) Notice: Subject to any disclaimer, the term of this patent is extended or adjusted under 35 U.S.C. 154(b) by 207 days.

(21) Appl. No.: 12/992,026

(22) PCT Filed: May 11, 2009

(86) PCT No.: PCT/US2009/043459
§ 371 (c)(1),
(2), (4) Date: Jan. 6, 2011

(87) PCT Pub. No.: WO2009/140199
PCT Pub. Date: Nov. 19, 2009

(65) Prior Publication Data
US 2011/0104532 A1  May 5, 2011

Related U.S. Application Data

(60) Provisional application No. 61/052,183, filed on May 10, 2008.

(51) Int. Cl.
*H01M 2/12* (2006.01)
*H01M 10/50* (2006.01)

(52) U.S. Cl.
USPC .............. 429/177; 429/56; 429/83; 429/120; 429/159

(58) Field of Classification Search
USPC ................ 429/82, 120, 121, 56, 83, 159, 177
See application file for complete search history.

(56) References Cited

U.S. PATENT DOCUMENTS

| | | | |
|---|---|---|---|
| 4,314,008 A * | 2/1982 | Blake ................................. 429/8 |
| 5,071,652 A | 12/1991 | Jones et al. |
| 5,354,630 A | 10/1994 | Earl et al. |
| 5,879,831 A | 3/1999 | Ovshinsky et al. |
| 6,001,504 A | 12/1999 | Batson et al. |
| 6,117,584 A | 9/2000 | Hoffman et al. |
| 6,255,015 B1 | 7/2001 | Corrigan et al. |
| 6,368,743 B1 | 4/2002 | Guerin et al. |

(Continued)

FOREIGN PATENT DOCUMENTS

| | | |
|---|---|---|
| CN | 1816271 | 9/2006 |
| CN | 1905268 | 1/2007 |

(Continued)

OTHER PUBLICATIONS

Extended European Search Report and Opinion for Application No. 08846235.3, Jul. 3, 2012, 8 pgs.

(Continued)

*Primary Examiner* — Sean P Cullen
(74) *Attorney, Agent, or Firm* — Faegre Baker Daniels LLP

(57) ABSTRACT

A battery module includes pressure release features for releasing excess pressure in a battery container, a wrap blanket disposed between a module and potting material disposed in a case to secure modules while allowing repair, replacement, recycling and/or reuse of modules and a connector.

15 Claims, 21 Drawing Sheets

(56) References Cited

U.S. PATENT DOCUMENTS

| | | |
|---|---|---|
| 6,406,815 B1 | 6/2002 | Sandberg et al. |
| 6,479,185 B1 | 11/2002 | Hilderbrand et al. |
| 6,709,783 B2 | 3/2004 | Ogata et al. |
| 6,729,908 B2 | 5/2004 | Benson et al. |
| 6,821,671 B2 | 11/2004 | Hinton et al. |
| 7,531,270 B2 | 5/2009 | Buck et al. |
| 2004/0016455 A1 | 1/2004 | Oogami |
| 2004/0050414 A1 | 3/2004 | Oogami |
| 2005/0089750 A1 | 4/2005 | Ng et al. |
| 2005/0100783 A1 | 5/2005 | Ro et al. |
| 2005/0220682 A1 | 10/2005 | McLean et al. |
| 2006/0169507 A1 | 8/2006 | Inoue et al. |
| 2007/0018610 A1 | 1/2007 | Wegner |
| 2007/0026301 A1 | 2/2007 | Lee et al. |
| 2007/0052390 A1 | 3/2007 | Kim et al. |
| 2007/0132429 A1 | 6/2007 | Onuki et al. |
| 2008/0090137 A1 | 4/2008 | Buck et al. |
| 2009/0023059 A1 | 1/2009 | Kinoshita et al. |
| 2010/0273042 A1 | 10/2010 | Buck et al. |
| 2010/0304203 A1 | 12/2010 | Buck et al. |

FOREIGN PATENT DOCUMENTS

| | | |
|---|---|---|
| JP | 2001-229897 | 8/2001 |
| JP | 2006/066322 | 3/2006 |
| JP | 2006 66322 | 3/2006 |
| JP | 2007 115437 | 5/2007 |
| WO | WO 2006 101343 | 9/2006 |
| WO | WO 2007/094263 | 8/2007 |

OTHER PUBLICATIONS

International Searching Authority, International Search Report, PCT/US2008/012545, Jan. 9, 2009, 1 pg.
International Searching Authority, Written Opinion of the ISA, PCT/US2008/012545, Jan. 9, 2009, 7 pgs.
International Searching Authority, International Search Report, PCT/US2008/013451, Feb. 9, 2009, 1 pg.
International Searching Authority, Written Opinion of the ISA, PCT/US2008/013451, Feb. 9, 2009, 5 pgs.
International Search Authority (ISA), International Search Report and Written Opinion of the ISA, PCT/US2009/043459, dated Sep. 9, 2009.

* cited by examiner

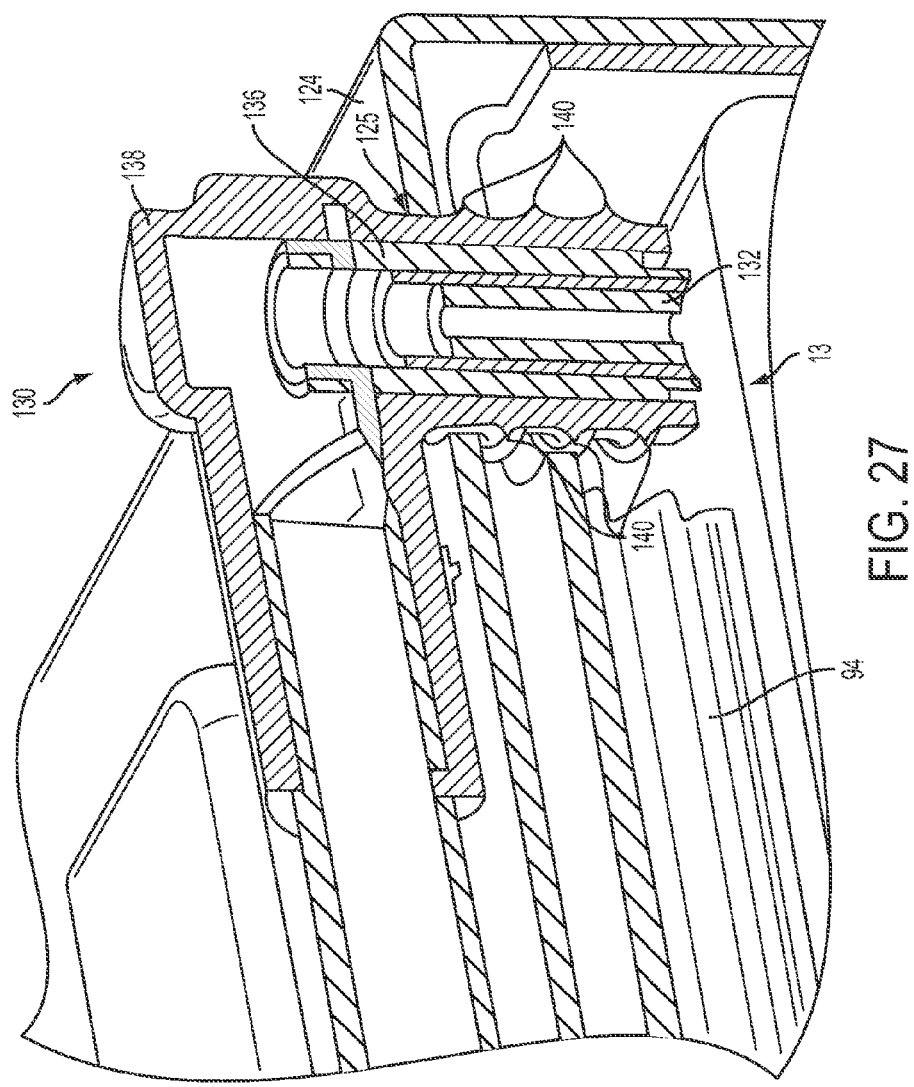

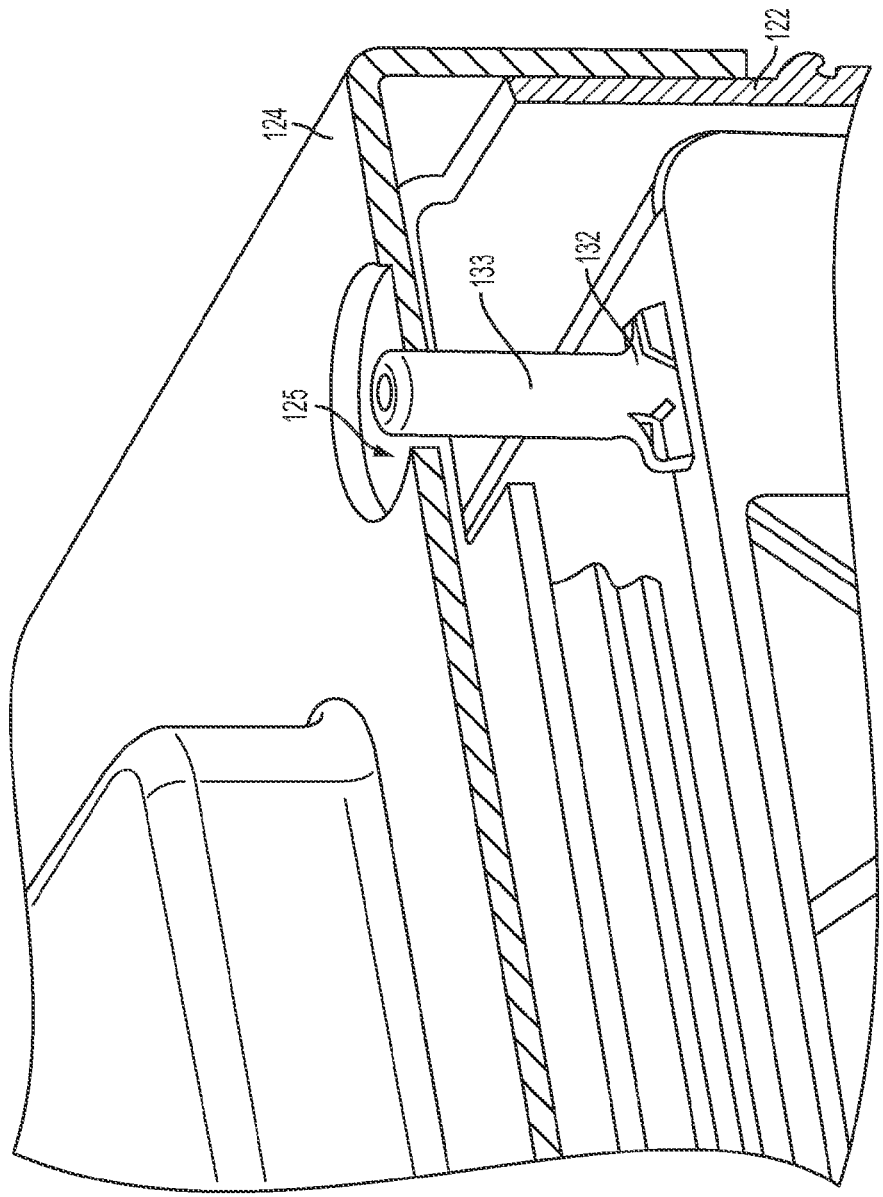

BATTERY ASSEMBLY INCLUDING BATTERY MODULE WITH WRAP BLANKET BETWEEN MODULE AND ENCAPSULATING SOLUTION

PRIORITY

The present application is related to, claims the priority benefit of, and is a U.S. national stage application of, International Patent Application Serial No. PCT/US2009/043459, filed May 11, 2009, which is related to, and claims the priority benefit of, U.S. Provisional Patent Application Ser. No. 61/052,183, filed May 10, 2010. The contents of each of these applications are hereby incorporated by reference in their entirety into this disclosure.

FIELD OF THE INVENTION

The subject disclosure relates to battery packs having cells and more particularly, to a battery pack for vehicles having a cooling system or a heating system for cooling the cells within the battery pack.

BACKGROUND AND SUMMARY

Motor vehicles, such as, for example, hybrid vehicles and electric vehicles use propulsion systems to provide motive power. In hybrid vehicles, the propulsion system most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells typically comprise electrodes and an ion conducting electrolyte positioned therebetween. Battery packs that contain lithium ion batteries are increasingly popular with automotive applications and various commercial electronic devices because they are rechargeable and have no memory effect. Storing and operating the lithium ion battery at an optimal operating temperature is very important to allow the battery to maintain a charge for an extended period of time.

Due to the characteristics of the lithium ion batteries, the battery pack operates within an ambient temperature range of $-20°$ C. to $60°$ C. However, even when operating within this temperature range, the battery pack may begin to lose its capacity or ability to charge or discharge should the ambient temperature fall below $0°$ C. Depending on the ambient temperature, the life cycle capacity or charge/discharge capability of the battery may be greatly reduced as the temperature strays from $0°$ C. Nonetheless, it may be unavoidable that the lithium ion battery be used where the ambient temperature falls outside the ambient temperature range.

Alluding to the above, in a battery or battery assembly with multiple cells, significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

The art is replete with various designs of the battery packs with cooling systems. The U.S. Pat. No. 5,071,652 to Jones et al. teaches a metal oxide-hydrogen battery including an outer pressure vessel of circular configuration that contains a plurality of circular cell modules disposed in side-by-side relations. Adjacent cell modules are separated by circular heat transfer members that transfer heat from the cell modules to the outer vessel. Each heat transfer member includes a generally flat body or fin which is disposed between adjacent cell modules. A peripheral flange is located in contact with the inner surface of the pressure vessel. The width of each cell module is greater than the length of the flange so that the flange of each heat transfer member is out of contact with the adjacent heat transfer member. The flanges are constructed and arranged to exert an outward radial force against the pressure vessel. Tie bars serve to clamp the cell modules and heat transfer members together in the form of a stack which is inserted into the pressure vessel.

The metal oxide-hydrogen battery taught by the U.S. Pat. No. 5,071,652 to Jones et al. is designed for cylindrical type of batteries. The U.S. Pat. No. 5,071,652 to Jones et al. teaches the heat transfer members be in direct contact with the vessel. Thus the U.S. Pat. No. 5,071,652 to Jones et al. does not teach creating a clearance between the vessel and the heat transfer members, which can be used to introduce cooling or heating agent to cool or heat the cells.

The U.S. Pat. No. 5,354,630 to Earl et al. teaches a common pressure vessel of a circular configuration type Ni—$H_2$ storage battery having an outer pressure vessel that contains a stack of compartments. Each of the compartments includes at least one battery cell, a heat transfer member, and a cell spacer for maintaining a relatively constant distance between adjacent compartments. The heat transfer members include a fin portion, which is in thermal contact with the battery cell, and a flange portion which extends longitudinally from the fin portion and is in tight thermal contact with the inner wall of the pressure vessel. The heat transfer member serves to transfer heat generated from a battery cell radially to the pressure vessel.

Similar to the metal oxide-hydrogen battery taught by the U.S. Pat. No. 5,071,652 to Jones et al., the storage battery taught by the U.S. Pat. No. 5,354,630 to Earl et al. is designed for cylindrical types of batteries. This metal oxide-hydrogen battery taught by the U.S. Pat. No. 5,354,630 to Earl et al. has the heat transfer members being in direct contact with the vessel thereby failing to create a clearance between the vessel and the heat transfer members which can be used to introduce cooling or heating agent to cool or heat the cells.

The U.S. Pat. No. 6,117,584 to Hoffman et al. teaches a thermal conductor for use with an electrochemical energy storage device. The thermal conductor is attached to one, or both, of the anode and cathode contacts of an electrochemical cell. A resilient portion of the conductor varies in height or position to maintain contact between the conductor and an adjacent wall structure of a containment vessel in response to relative movement between the conductor and the wall structure. The thermal conductor conducts current into and out of the electrochemical cell and conducts thermal energy between the electrochemical cell and thermally conductive and electrically resistive material disposed between the conductor and the wall structure. The thermal conductor taught by the U.S. Pat. No. 6,117,584 to Hoffman et al. is attached to one or both of the anode and cathode contacts of the cell and not between the cells.

The U.S. Pat. No. 6,709,783 to Ogata et al. teaches a battery pack having a plurality of prismatic flat battery modules constituted by nickel metal hydride batteries, arranged parallel to each other. Each battery module consists of an integral case formed by mutually integrally connecting a plurality of prismatic battery cases having short side faces and long side faces, the short side faces constituting partitions between adjacent battery cases and being shared. A plurality of spacers are made of a sheet bent in opposite directions such that alternately protruding grooves or ridges respectively contact the opposite long side faces of the battery modules for providing cooling passages between the battery modules. The battery pack taught by the U.S. Pat. No. 6,709,783 to Ogata et al. is intended to define voids, i.e. the cooling passages between the cells thereby diminishing the packaging characteristics of the pack.

The U.S. Pat. No. 6,821,671 to Hinton et al. teaches an apparatus for cooling battery cells. As shown in FIG. 1 of the U.S. Pat. No. 6,821,671 to Hinton et al., a cooling fin is connected to the battery cell having railings for holding the cooling fin as each cooling fin slides between the railings thereby fitting the cooling fin within the respective battery cell thereby forming the aforementioned apparatus. The engagement of the cooling fin with the battery cell is presented in such a manner that the cooling fins do not extend beyond the battery cells. Thus, the cooling agent only serves its intended purpose if introduced from the side of the apparatus. If, for example, the cooling agent is applied to the front of the apparatus, only first battery cell is exposed to the cooling agent thereby preventing effective cooling of other battery cells.

Alluding to the above, FIG. 7 of the U.S. Pat. No. 6,821,671 to Hinton et al. shows the apparatus wherein straps are inserted through ears extending from the cooling fins to connect multiple battery cells to form the apparatus and fins together to keep the battery cells in compression. The straps, as shown in FIG. 7 deform the battery cells thereby negatively affecting chemical reaction between electrolyte, cathodes and anodes of each battery cells and resulting in a reduced life span of the cells.

The Japanese publication No. JP2001-229897 teaches a battery pack design and method of forming the same. The purpose of the method is to create the voids between the cells for cool air to go through the voids and between the cells to cool the cells. Similar to the aforementioned U.S. Pat. No. 6,709,783 to Ogata et al., the battery pack taught by the Japanese publication No. JP2001-229897 is intended to define the voids between the cells thereby diminishing the packaging characteristics of the pack.

Packaging of lithium battery cells is one of the areas of continuous development and research. Generally, the lithium battery cells packaged in a metallic case are known, as shown, for example, in U.S. Pat. No. 6,406,815. These metallic cases have the advantage of protecting the cells from handling and vibration damage. They are also dimensionally consistent, allowing for combining of multiple cases into a single large pack as disclosed in U.S. Pat. No. 6,368,743. However, the metallic cases are expensive to manufacture and each different configuration requires new dies to produce the various components and new tools to assemble those components. Consequently, techniques and materials for enclosing lithium battery cells in envelopes creating lithium battery cell packs have been developed, one type of which is disclosed in U.S. Pat. No. 6,729,908. Unfortunately, these packages do not provide structural rigidity or protection from handling and vibration nearly as well as the metallic cases, nor can they be combined into consistently sized groups of cells because of the inherent variation in the thickness of a lithium battery cell pack.

Therefore, there remains an opportunity to improve upon the packs of lithium batteries of the prior art to increase the ambient temperature range at which the lithium battery operates and to provide a new battery pack with improved packaging and safety characteristics.

Also, there remains an opportunity to maintain the battery pack at the optimal operating temperature to ensure the longest possible life cycle, rated capacity, and nominal charge and discharge rates.

There is also an opportunity provide a new frame design that will present structural rigidity or protection from handling and vibration nearly as well as the metallic cases, as the cells are combined into consistently sized groups of cells or modules because of the inherent variation in the thickness of a lithium battery module or cell pack. Also there remains another opportunity to provide a solution that allows escape of gases away from the passenger compartment of the vehicle as pressure inside the battery pack exceeds the normal pressure thereby preventing escape of gases in to the compartment to eliminate potential risk and any unwanted hazardous events to driver and/or passengers. A battery assembly of the present disclosure is adaptable to be utilized in various configurations including and not limited to horizontally or vertically stacked battery cell packaging configurations used in an automotive vehicle. A plurality of battery modules are housed in a container, such as, for example, a dish or support tray which may include a cover. The container may be supported by a floor pan assembly or other part of the vehicle. The container presents a base and a plurality of side walls extending therefrom. At least one pressure release device is disposed in the base or walls for allowing fluid such as gas, to escape beyond the dish. The pressure release device may be, for example, a rupture element or disk formed by scoring or otherwise weakening areas of the container or a valve device. In one embodiment, a plurality Of rupture elements are disposed in the walls of the container. The rupture elements may present scoring lines that rupture under high pressure. As an alternative to the rupture elements, the battery assembly may include a valve device that would enable low pressure venting as well as emergency high pressure venting. In one embodiment, the valve device is disposed in the base of the container and is configured to selectively open and close an opening formed in the base of the container. In one embodiment, the valve device includes a closure plate with a seal or O-ring, a spring retainer portions of which extend across the opening in the base of the dish, a rod with a compression plate that is spaced opposite from the closure plate, and a spring or biasing element disposed between the closure plate and the compression plate and secured by the spring retainer. In one embodiment, the spring retainer is in the form of a cross and includes a core portion and, illustratively, at least four radial portions with each presenting a high pressure break feature. The valve device and rupture elements provide an over pressure relief system and act as "bursting elements". The areas wherein the devices are disposed are designed to break open during an event which would cause the pressure within the battery pack to exceed specified limits.

In one embodiment of the disclosed battery module, a potting material, such as for example, polyurethane, polyurethane foams, silicones or epoxies, is injected into the battery module placed in a case to at least partially or fully encapsulate the battery module and the corresponding cells thereby eliminating air gaps between the module and the case. The potting material also serves to prevent the electrode stack from shifting inside the cell packaging material during exposure to shock and vibration. The potting material also prevents the cell packaging from relaxing over time and allowing the electrolyte to settle into the base of the cell package and thus reducing the cell's electrical capacity. The potting/encapsulating material also prevents movement of the battery module within the battery pack case. A wrap blanket is disposed between the module and the potting material thereby providing "green" solution to allow the user to remove the module from the dish and service the module or simply to recycle the pack in a highly efficient fashion.

An advantage of the present disclosure is to provide a solution that allows escape of gases away from the passenger compartment of the vehicle by placing pressure release elements in the dish, wherein the pressure release elements activate as pressure inside the pack exceeds the normal or predetermined pressure thereby preventing escape of gases in to the passenger compartment to eliminate potential risk and any unwanted hazardous events to driver and/or passengers.

Still another advantage of the present disclosure is to provide a battery module having excellent retention that surrounds and secures the cells.

Still another advantage of the present disclosure is to provide a battery module having excellent retention that surrounds and secures the electrode stack within the cell envelope from shifting.

Still another advantage of the present disclosure is to provide a battery module encapsulated by the potting material which greatly reduces the potential permeation of liquids into the battery pack, or leakage from inside the battery module to the outside of the battery pack thereby preventing reduced product life or premature failures of the battery module.

Still another advantage of the present disclosure is to provide a low mass design of a battery pack which includes polyurethane foam as a potential retention device, which is very competitive to that of traditional methods of retention, such as, for example, silicone or epoxy adhesives.

Still another advantage of the present disclosure is to provide a packaging method which utilizes a case that houses the module and an encapsulant which locks the module in position and will allow the pack to be mounted in any orientation.

Still another advantage of the present disclosure is to provide a battery pack that reduces manufacturing costs due to simplified assembly methods.

Still another advantage of the present disclosure is to provide a pack that is simple in design and has a reduced mass.

The disclosed battery assembly provides several advantages over the battery packs of the prior art by increasing an ambient temperature range at which the battery pack can operate. Also, the disclosed battery assembly helps maintain the battery pack at an optimal operating temperature to extend the life cycle of the battery pack, and to increase battery pack safety.

BRIEF DESCRIPTION OF THE DRAWINGS

Other advantages of the present disclosure will be readily appreciated as the same becomes better understood by reference to the following detailed description when considered in connection with the accompanying drawings wherein:

FIGS. 26 and 27 are perspective views with portions removed of the battery sub-pack of FIG. 23 and a connector and cable; and FIG. 28 is a perspective view with portions removed of the battery sub-pack of FIG. 23.

DETAILED DESCRIPTION

Figure 1:
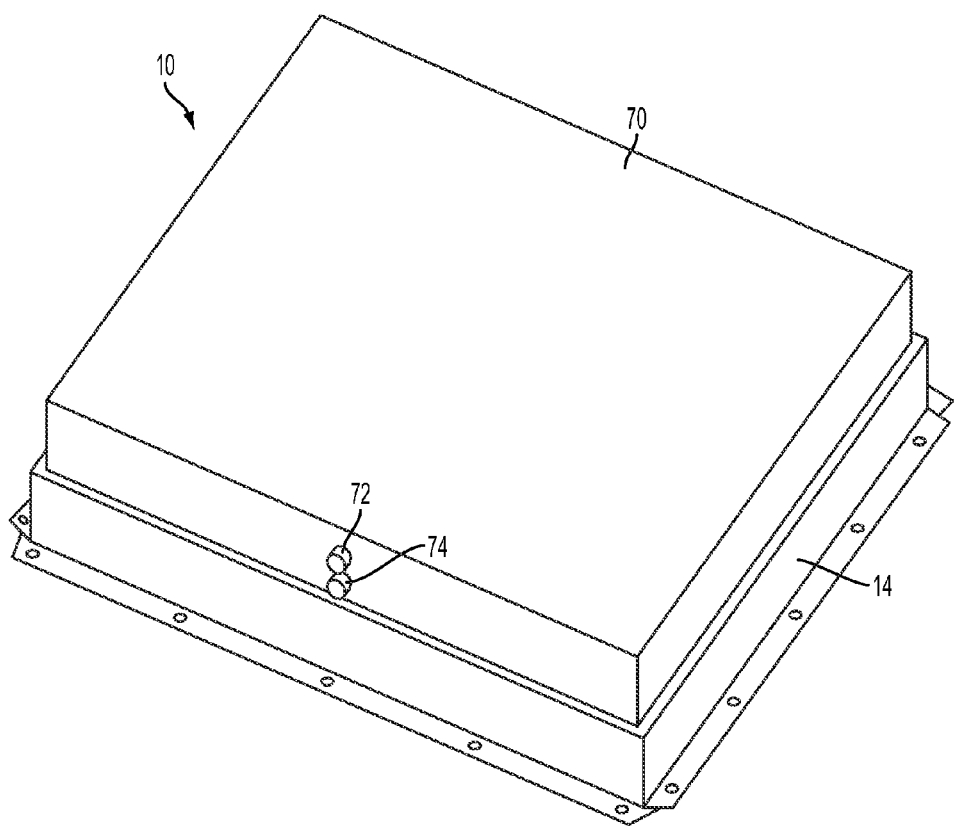
FIG. 1 is a perspective view of a battery pack assembly showing a dish and a cover with fluid inlets and outlets in which a plurality of battery sub-packs and other components are housed.

Referring to the Figures, wherein like numerals indicate like or corresponding parts, a battery assembly or battery pack of the present disclosure is adaptable to be utilized in various configurations including and not limited to a horizontally or vertically stacked battery cell packaging configuration used in an automotive vehicle applications. The battery assembly or pack or battery pack assembly is generally shown at 10 in FIG. 1. The battery assembly 10 includes a plurality of battery sub-packs, each generally shown at 12 in FIG. 6.

As best shown with reference to FIGS. 11-22, each battery module 13 of each sub-pack 12 includes a plurality of cells 91. Preferably, each cell 91 is a lithium ion cell without limiting the scope of the present disclosure. Those skilled in the battery art will appreciate that other cells can be utilized within the scope of the present disclosure. Each cell 91 includes a plurality of battery components (not shown) co-acting between one another with electrolyte therebetween as known to those skilled in the lithium battery art.

According to one embodiment, the disclosed battery pack has a plurality of battery modules 13 each presenting a multitude of cells 91 each sandwiched by respective heatsinks 99 formed from thermally conductive materials such as, for example, flat stock aluminum alloy foils and the like, without limiting the scope of the present disclosure. Preferably, each cell 91 is a lithium ion cell having a first current collector and a first electrode adjacent the first current collector and a second current collector and a second electrode of charge opposite from the first electrode and adjacent the second current collector. A separator layer is positioned between the first and second electrodes with the first and second electrodes conducting electrolyte therebetween. The plurality of the first electrodes and the second electrodes are stacked and packaged into an electrical insulating envelope to form a cell 91. The cell packaging includes side edges and terminal ends. Illustratively, one terminal end includes a first bend extending therefrom in a first direction. Another terminal end includes a second bend extending therefrom in a second direction opposite from the first direction. One example of such a construction is described more fully in U.S. Patent Publication No. 2008/0090137, (U.S. patent application Ser. No. 11/748,690 filed May 15, 2007), now U.S. Pat. No. 7,531,270, the disclosure of which is incorporated herein by this reference to the full extent permissible by law.

The heatsink includes terminal ends, and top and bottom thermal transfer edges. The top and bottom thermal transfer edges may include a plurality of fins integral with and extending from the heatsink. The fins may be cold formed and are designed to transfer heat either to or from the cells 91 depending on application. A pair of electrically insulating spacer devices or ears are mechanically attached on each side of the heatsink. A plurality of studs are molded into and extend from the spacer on one side of the heatsink, while a spacer without the plurality of studs but with relief for a sensor occupies the opposite side to form a heatsink assembly. The cell terminals are folded over the studs in an electrical series or electrical parallel configuration. The cells 91 are disposed between the heatsink assembly. Several examples of heatsinks that may be utilized within the teaching of this disclosure are described more fully in the above referenced U.S. Patent Publication No. 2008/0090137, now U.S. Pat. No. 7,531,270.

In one embodiment of the disclosed battery assembly 10, a plurality of flexible circuits are positioned over the studs for sensing voltage at every series connection. Integral sensors are positioned on the flexible circuit to provide temperature sensing. A nut with integral spring washer is threaded over each stud to provide for electrical conductivity and mechanical retention. Two end or compression plates 104, 106 are attached to the heatsink assemblies aligned with one another with the cells 91 disposed therebetween. One example of such an assembly that may be utilized within the teaching of this disclosure is described more fully in the above referenced U.S. Patent Publication No. 2008/0090137, now U.S. Pat. No. 7,531,270.

In one embodiment of the disclosed heatsink assemblies, illustratively at least four tie rods 110 extend peripherally through each of the heatsink assemblies and the compression plates 104, 106 thereby placing the entire battery module 13 into a compressive state to promote shorter path length for ion conduction inside the cell 91 and improved thermal transfer of heat either to or from the heatsink 99.

Figure 2:
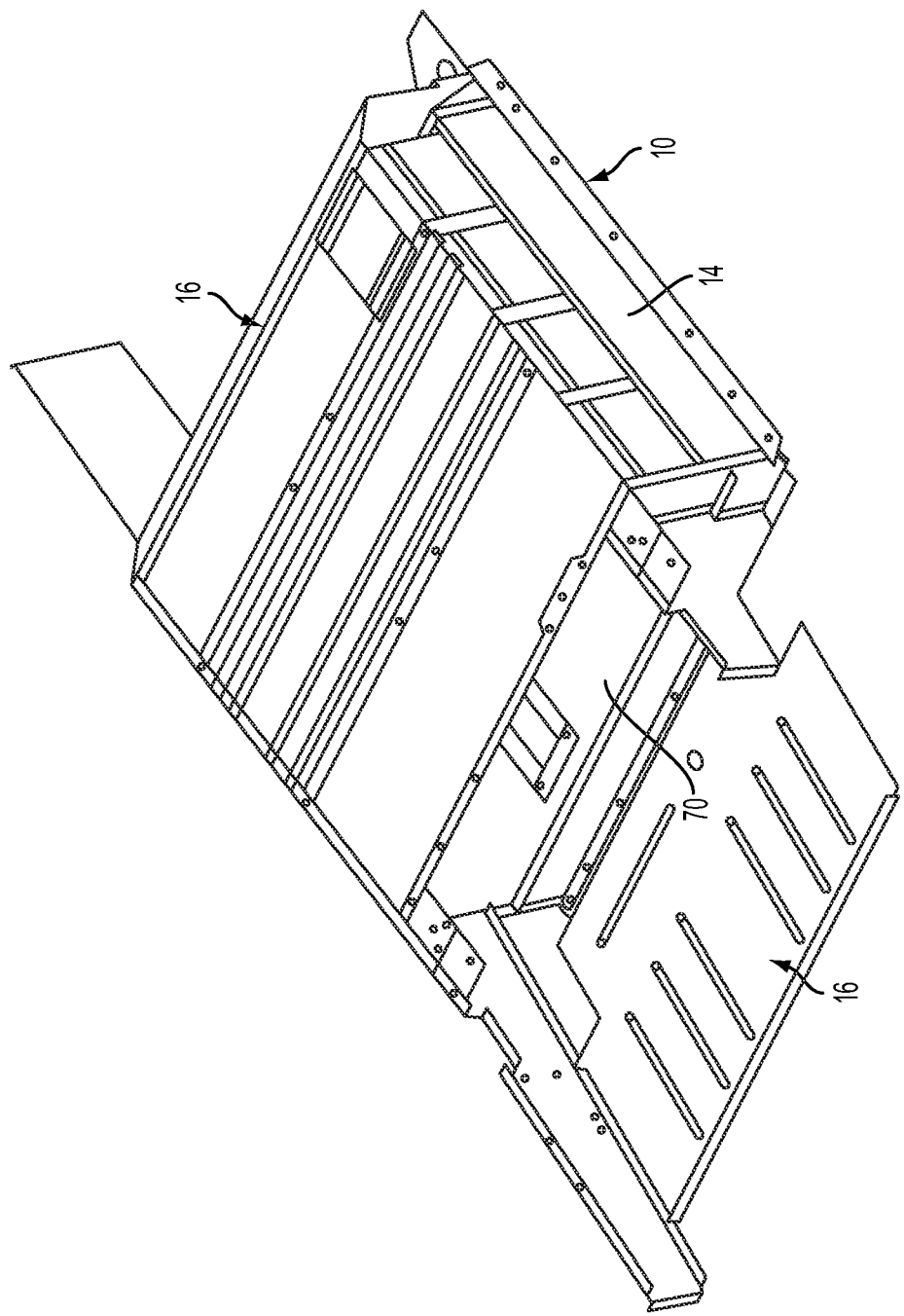
FIG. 2 is a perspective view of the battery assembly of FIG. 1 supported by a floor pan assembly of a vehicle.
Figure 3:
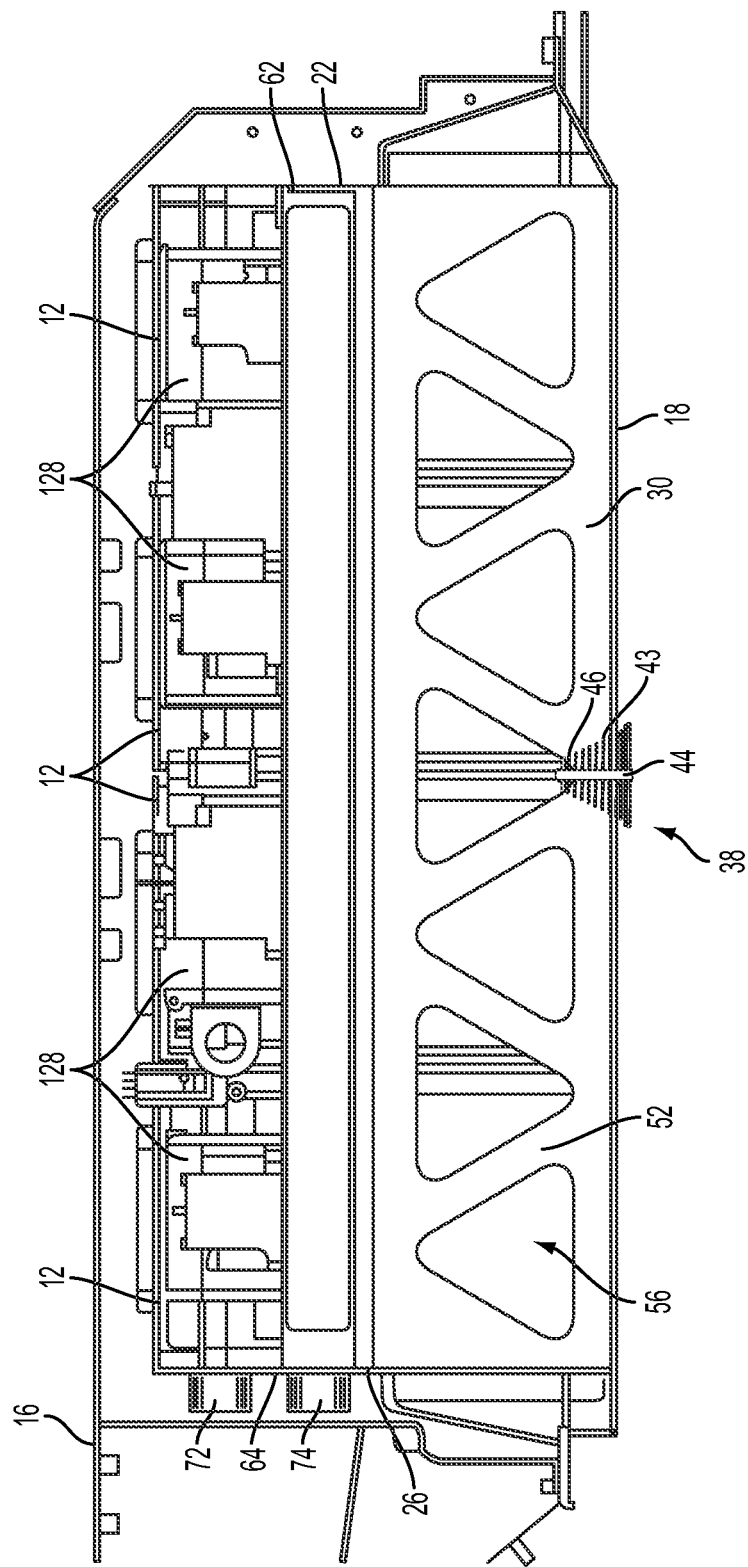
FIG. 3 is a sectional view taken along the longitudinal axis of the battery pack assembly supported by the floor pan assembly of the vehicle showing a valve acting as one embodiment of a high pressure release elements located in the base of the dish inside a central bridge formed to include a plenum allowing fluid such as air to be circulated through the battery pack assembly.
Figure 4:
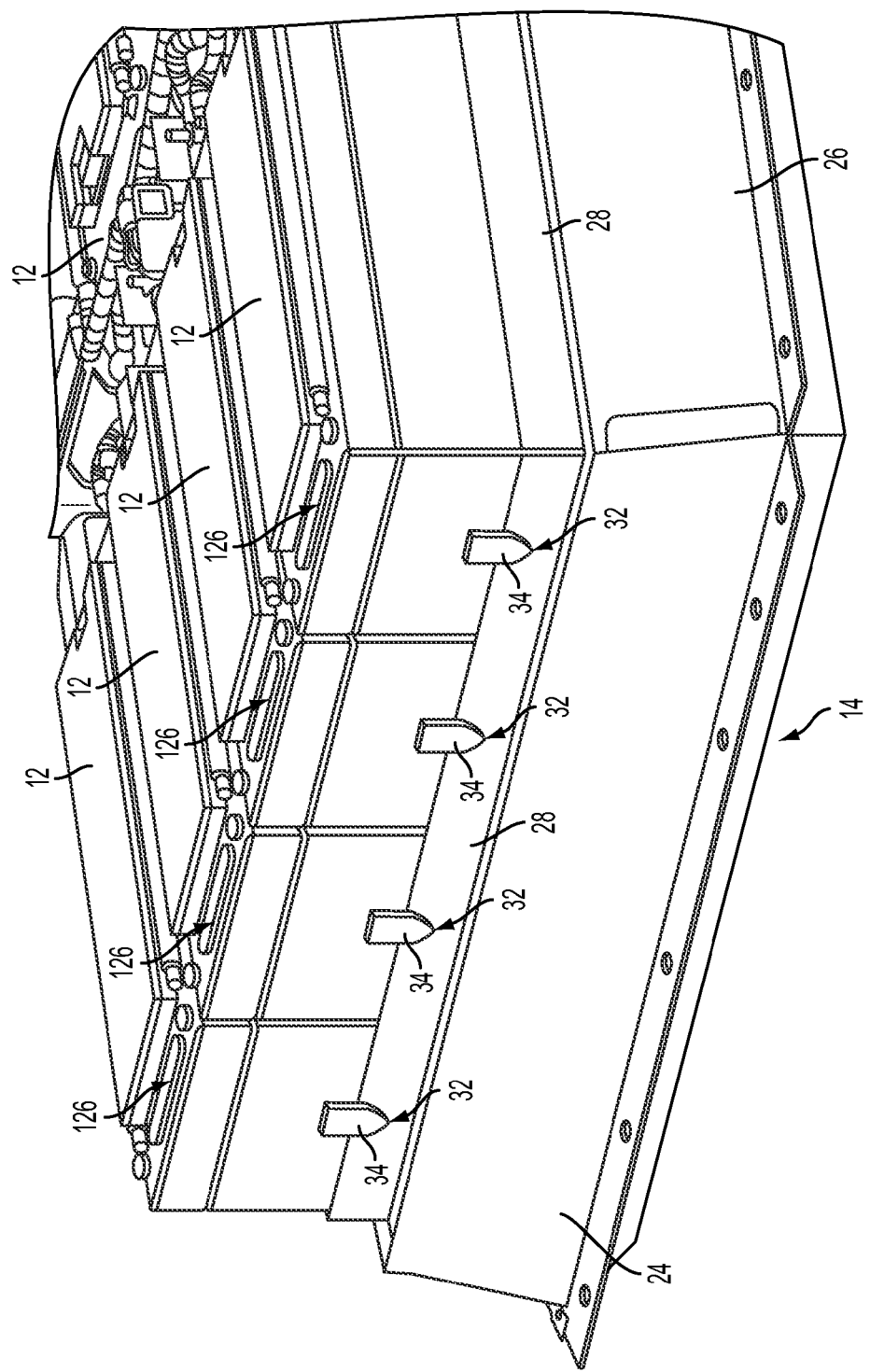
FIG. 4 is a partial perspective view of the battery assembly of FIG. 1 with the cover removed showing the dish, battery sub-packs and other components.
Figure 5:
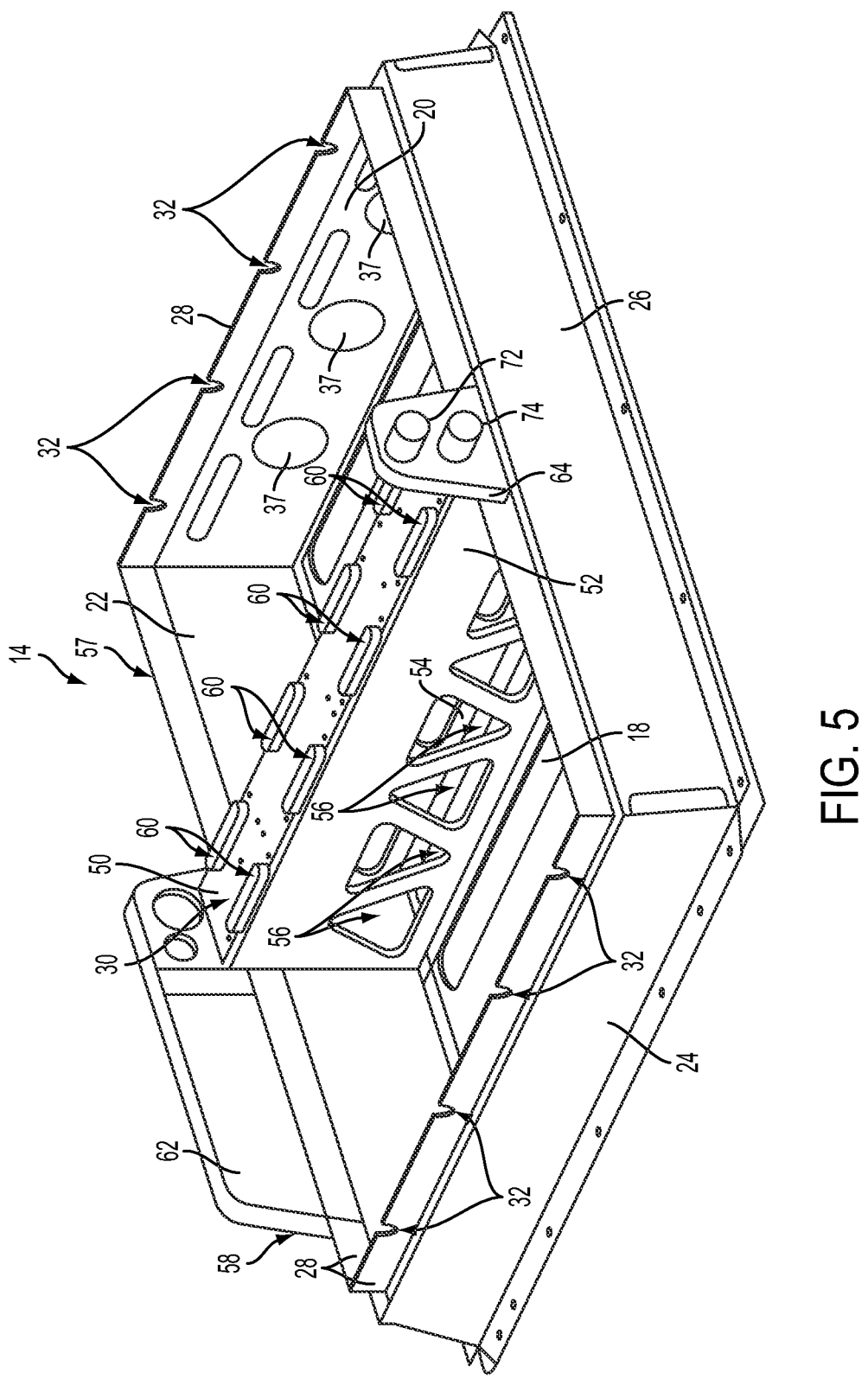
FIG. 5 is perspective view of the dish or support tray of FIG. 1 showing a plurality of pressure release elements in side walls of the dish.
Figure 24:
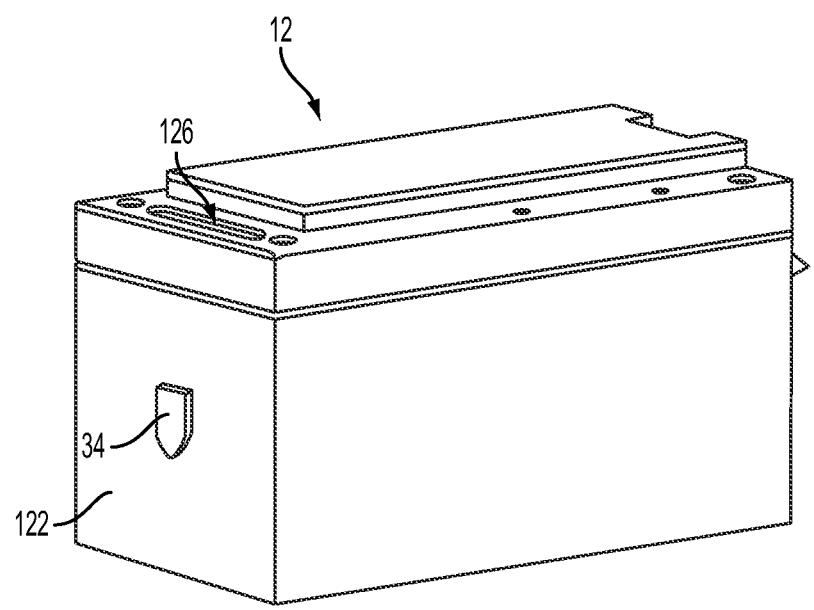
FIG. 24 is a perspective view from a different perspective of the battery sub-pack of FIG. 23.

As best shown in FIGS. 2-6 and 21-27, the modules 13 may be enclosed in housings to form a plurality of battery sub-packs 12 which are housed in a container such as a dish or support tray, generally indicated at 14. As best shown in FIGS. 2 and 3, the dish 14 is supported by a floor pan assembly 16 or other part of the vehicle (not shown). As best shown in FIGS. 3-5, the dish 14 presents a base 18 and a plurality of side walls 20, 22, 24, 26 extending therefrom. The side walls 20, 22, 24, 26 may be generally perpendicular to the base 18 and may be slightly inclined without limiting the scope of the present disclosure. A peripheral lip 28 extends from each wall 20, 22, 24, 26. The walls 20 and 24 that extend parallel to a bridge, generally indicated at 30, include a plurality of first locking elements 32, such as scalloped cut out portions to receive a respective plurality of second locking elements 34, such as tongs, extending from the sub-packs 12, as shown in FIGS. 3, 4 and 24, thereby securing the modules 12 within the dish 14 in mechanical connection and preventing relative movement of the modules 12 inside the dish 14. The type of the mechanical connection as illustrated herein is not intended to limit the scope of the present disclosure. The walls 20 and 24 may also extend parallel to the bridge 30.

Figure 6:
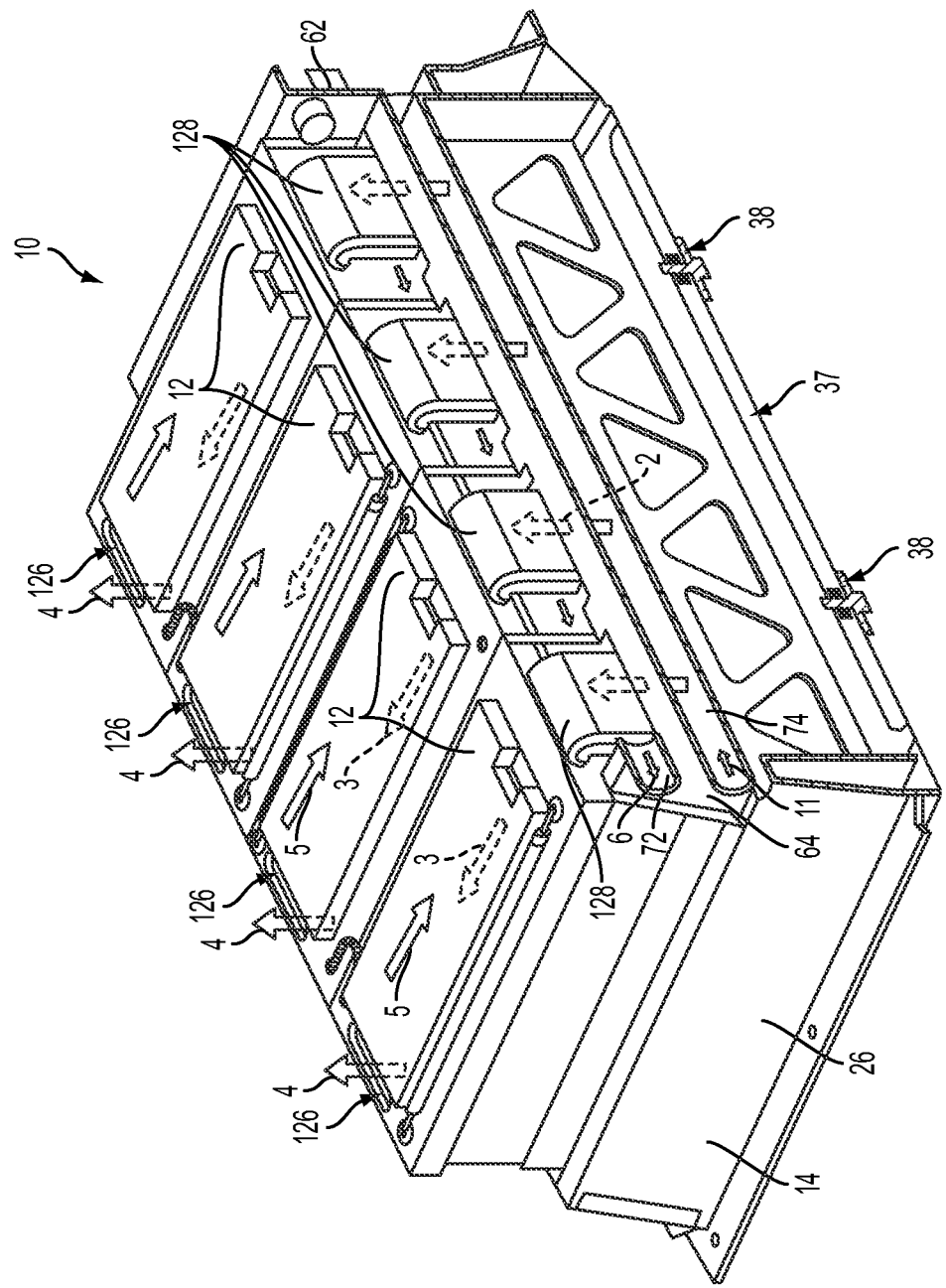
FIG. 6 is a perspective section view of the battery pack assembly of FIG. 1 with the cover removed showing a typical airflow path through the battery pack assembly and showing pressure release elements located on the base of the dish in the area inside the bridge.

As shown for example, in FIG. 6, a typical airflow 11 for controlling the temperature of the disclosed battery assembly has air from an external source entering the interior of the housing formed from the dish 14 and cover 70 through the air inlet 72 in the direction of arrow 1. This external source of air may in some embodiments be conditioned air from a vehicles air conditioning and heater system. In such a situation, the pressure relief devices 38 help to prevent gasses from the battery pack from entering into the passenger compartment of a vehicle via the vehicles air conditioning and heating system during a high pressure condition, such as resulting from an emergency situation in which a battery sub-pack 12 rupture, by providing an alternative path for exhausting the gasses. The air entering the interior of the battery pack 10 flows through a plenum formed in the bridge 30 then in the direction of arrow 2 through the ports 60 and tubular member 128 into the interior of each battery sub-pack 12. In the interior of each sub-pack 12 the air flows in the direction of arrow 3 across the fins 94 of the heat transfer elements 99. The air exits the interior of each battery sub-pack 12 in the direction of arrow 4 through the slot 126 formed in the housing cover 124. The air then flows in the direction of arrow 5 across the exterior of the housing cover 124 of each sub-pack 12 so that it can be exhausted in the direction of arrow 6 through the outlet port 74.

Figure 9:
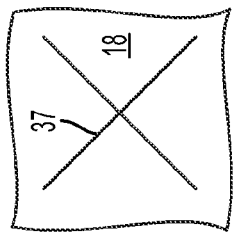
FIG. 9 is a plan view of a burst element formed by scoring the base of the dish.

A plurality of pressure release elements are disposed in the dish 14 for allowing fluid such as gas, to escape beyond the dish 14. The pressure release elements may include rupture elements or disks 37 disposed in the walls 20 and 24 for allowing fluid such as gas, to escape beyond the dish 14. The rupture elements 37 may present scoring lines formed in the wall of the dish in a circular pattern that rupture under high pressure to discharge a disk from the wall leaving an opening through which pressurized fluid may exit the dish. Alternatively, as shown in FIG. 9, the rupture element 37 may present scored lines in other shapes in the base 18 of the dish 14, such as the illustrated X-shape, that burst open in high pressure situations creating and opening for discharging fluid.

Figure 7:
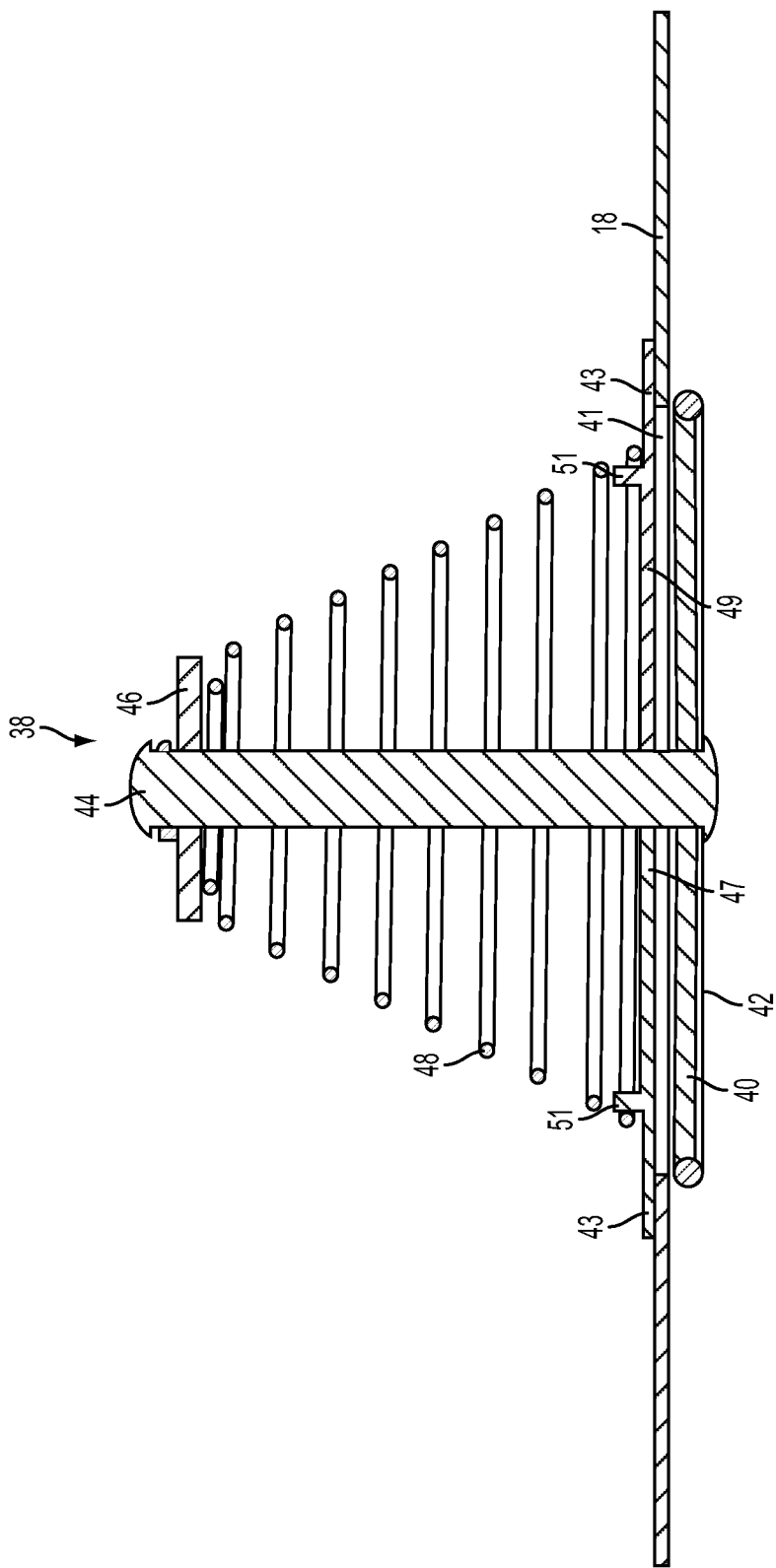
FIG. 7 is a sectional view of a valve assembly type of pressure release element with a spring retainer in the form of a spring retainer cross attached to the base of the dish across a hole formed through the base of the dish with the valve assembly being biased to normally close the hole formed through the base of the dish.

As an alternative to the rupture elements 37, the pressure release elements of the disclosed battery assembly 10 may include a valve device 38 that acts as the pressure relief element, as shown in FIGS. 3, 6, 7 and 8 that would enable low pressure venting as well as emergency high pressure venting. As shown in FIG. 7, rupture elements 37 and valve devices 38 may be used together within the scope of the disclosure.

Figure 8A:
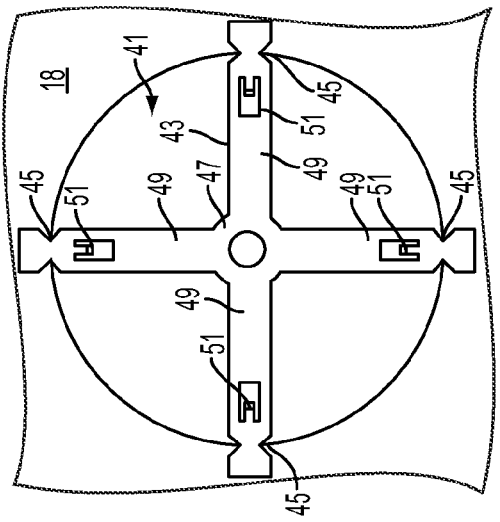
FIG. 8A is a plan view of a retaining spring cross of one embodiment of the disclosed battery assembly attached to the base of the dish across a hole formed in the base of the dish with high pressure break features located at the periphery of the hole so that upon breakage portions of the retaining spring cross spanning the hole and the remainder of the valve assembly can be ejected from the battery assembly leaving a large opening for discharging fluid from the dish.
Figure 8B:
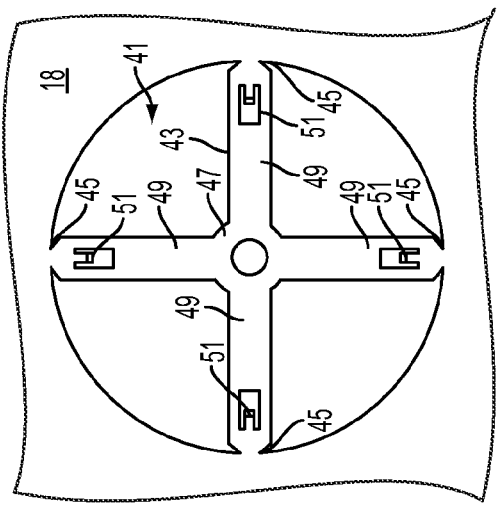
FIG. 8B is a plan view of a retaining spring cross of one embodiment of the disclosed battery assembly integrally formed in the base of the dish having high pressure break features located so that upon breakage the retaining spring cross and the remainder of the valve assembly can be ejected from the battery assembly leaving a large opening for discharging fluid from the dish.

In one embodiment of the disclosed battery assembly 10, the valve device 38 is disposed in the base 18 of the dish 14 to selectively open and close an opening 41 extending through the base 18 of the dish 14 and is biased to normally close the opening 41. One embodiment of the valve device 38 includes and a closure plate 40, illustratively in the form of a disk, with a seal or O-ring 42, a spring retainer 43 extending across the opening 41 in the base 18 of the dish, a linkage member such as rod 44 with a compression plate 46 that is spaced opposite from the disk 40, and a spring or biasing element 48 disposed between the plate 46 and the disk 40 and secured by the spring retainer 43, as best shown in FIG. 7. As shown for example in FIG. 8A, one embodiment of the spring retainer 43 may include a retainer spring cross mechanically engaged with the base 18 of the dish 14. As shown for example, in FIG. 8B, one embodiment of the spring retainer 43 may be a retainer spring cross integrally formed in the base 18 of the dish 14. As shown, in FIGS. 8A and B, the retainer spring cross 43 includes a core portion 47 formed to include a hole to allow rod 44 to pass therethrough and at least four radial portions 49 with each presenting a high pressure break feature 45. Radially inwardly from each break feature 45, each radial portion 49 is formed to include an upwardly extending spring retainer lip 51. As shown in FIGS. 7 and 8, the break features 45 are positioned adjacent the walls of the opening 41 in the base of the dish 14. The cross 43 holds the valve in place under normal low pressure situations but will break at the high pressure break features 45 under high pressure. Under normal operating pressure, the spring or biasing element 48 is located inside the dish 14. Illustratively, the spring 48, rod 44 and compression plate 46 are sized and the spring retainer lip 51 is positioned, so that upon rupture of the high pressure break features 45 in a high pressure situation, the valve assembly is at least substantially discharged from the dish 14 leaving a substantially unobstructed opening 41 for discharge of fluids.

As shown, for example, in FIGS. 3, 5 and 6, a bridge 30 extends between the walls 22 and 26 of the dish 14. The bridge 30 includes a top portion 50 and side walls 52 and 54 extending generally perpendicular to the side walls 20 and 24. The bridge 30 divides the dish 14 into two sections 57 and 58 to house a plurality of the modules 13 which may be enclosed in cases or housings to form a plurality of battery sub-packs 12. The side walls 52 and 54 present a plurality of slots 56 to provide fluid passage between the sections 58 and 57 to escape from the dish 14. The valve devices 38 or rupture elements 37 will be disposed in the base 18 and between the side walls 52 and 54 extending from the walls 22 and 26. The top portion 50 presents a plurality of ports 60 spaced from one another and extending in two rows from the walls 22 to wall 26 of the dish 14.

The valve devices 38 provide an over pressure relief system and act as "bursting elements". The areas wherein the devices 38 and rupture elements 37 are disposed are designed to break open during an event which would cause the pressure within the battery pack 10 to exceed specified limits.

In one embodiment of the disclosed battery assembly 10, the ports 60 would fluidly communicate with each of the sub-packs 12 as illustrated in FIG. 6. First and second brackets 62 and 64 are integral with and extend from the walls 22 and 26 and aligned with the top portion 50. The brackets 62 and 64 may present various designs as shown in FIGS. 2 and 6 or may be identical without limiting the scope of the present disclosure. A cover 70 is designed to enclose the dish 14 with the sub-packs 12 disposed therein, as shown in FIGS. 1-3. The material of the dish 14 and the cover 70 is not intended to limit the scope of the present disclosure. In one embodiment of the disclosed battery assembly, both of the cover 70 and the dish 14 may be formed from metal and metal alloys, polymers, and combination thereof.

Figures 10A, 10B:
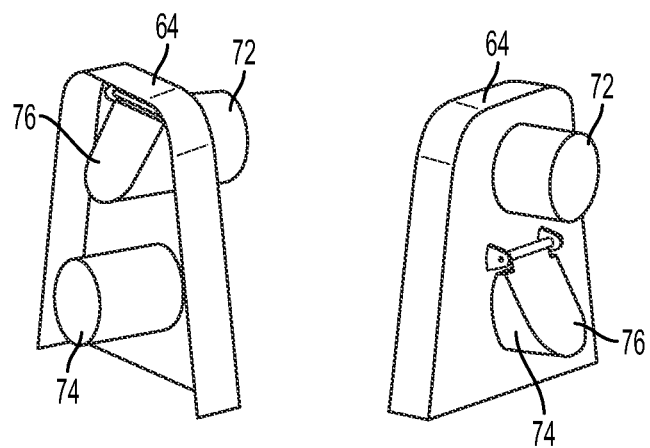
FIGS. 10 A, B and C are various views of the air inlet and outlet formed in the dish for circulating air through the dish.
Figure 10C:
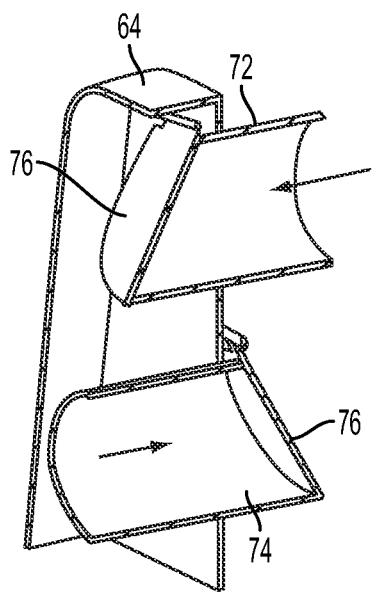
Figure 11:
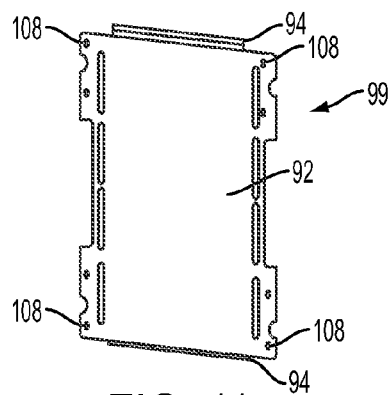
FIG. 11 is a perspective view of a heatsink element having a corrugated thermal fin extending from one edge of a sheet and an L-shaped thermal.

FIG. 10A-C provides several views the first bracket 62. Each bracket 62 and 64 includes airflow check valve features 76 connected to a respective biasing element. Biasing elements actuate the valve features 76 to open or close based on pack pressure. When cooling air is required, pressure from a fan system opens the inlet valve feature 76 of inlet port 72. When the pressure is no longer present, the spring tension closes the valve feature 76 of inlet port 72. If the pack 10 experiences internal overpressure, the inlet valve feature 76 of inlet port 72 will be closed and the valve feature 76 of outlet port 74 will be opened. The valve feature 76 of inlet port 72 additionally serves to keep fumes and gases from a thermal event from entering the passenger compartment.

Figure 12:
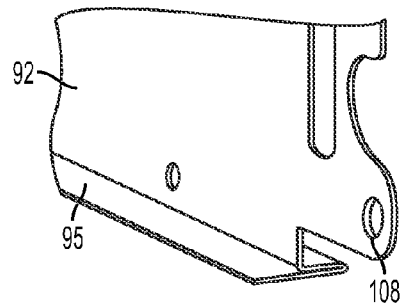
FIG. 12 is a close up perspective view of a portion of the heatsink element of FIG. 11.
Figure 13:
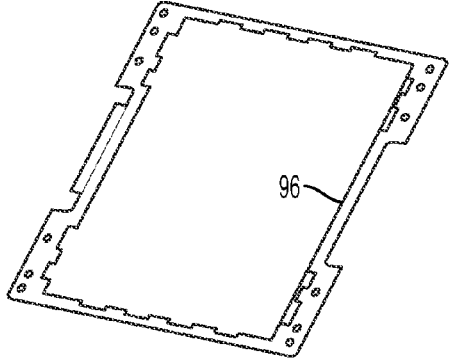
FIG. 13 is a perspective view of a frame member utilized to secure components of the battery module together.
Figure 16:
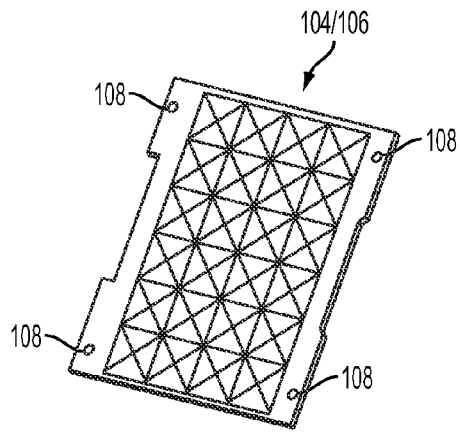
FIG. 16 is a perspective view of a cover utilized to form a battery module.
Figure 17:
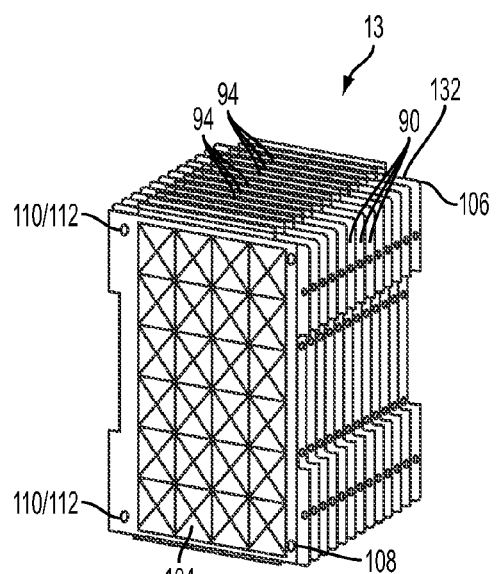
FIG. 17 is a perspective view of a battery module formed utilizing a plurality of cell assemblies of FIG. 15 and two covers of FIG. 16.
Figure 18:
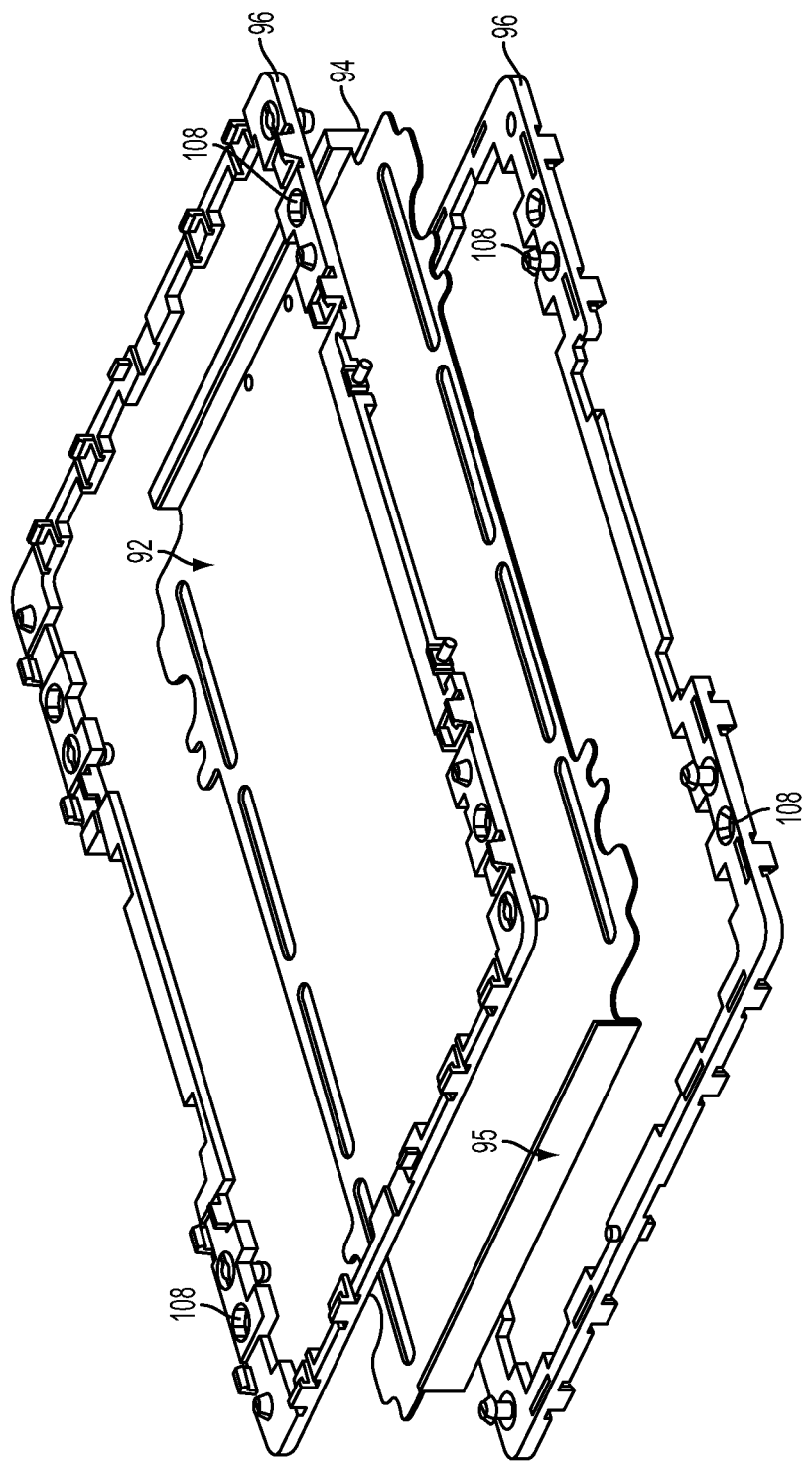
FIG. 18 is an exploded view of an alternate heatsink assembly utilizing slight variants of the heatsink of FIG. 11 and the frame member FIG. 13.
Figure 19:
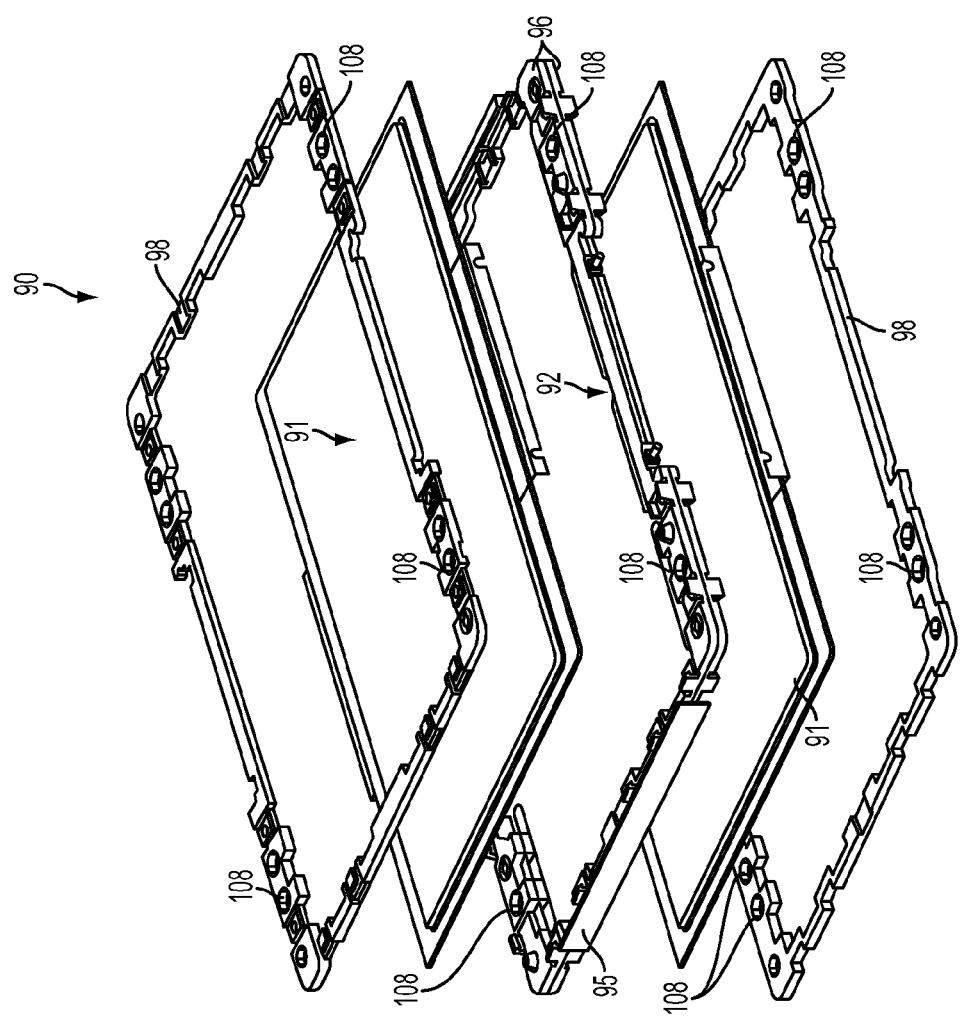
FIG. 19 is an exploded view of a cell assembly formed using the heatsink assembly of FIG. 18 and modified frame members of FIG. 18.
Figure 20:
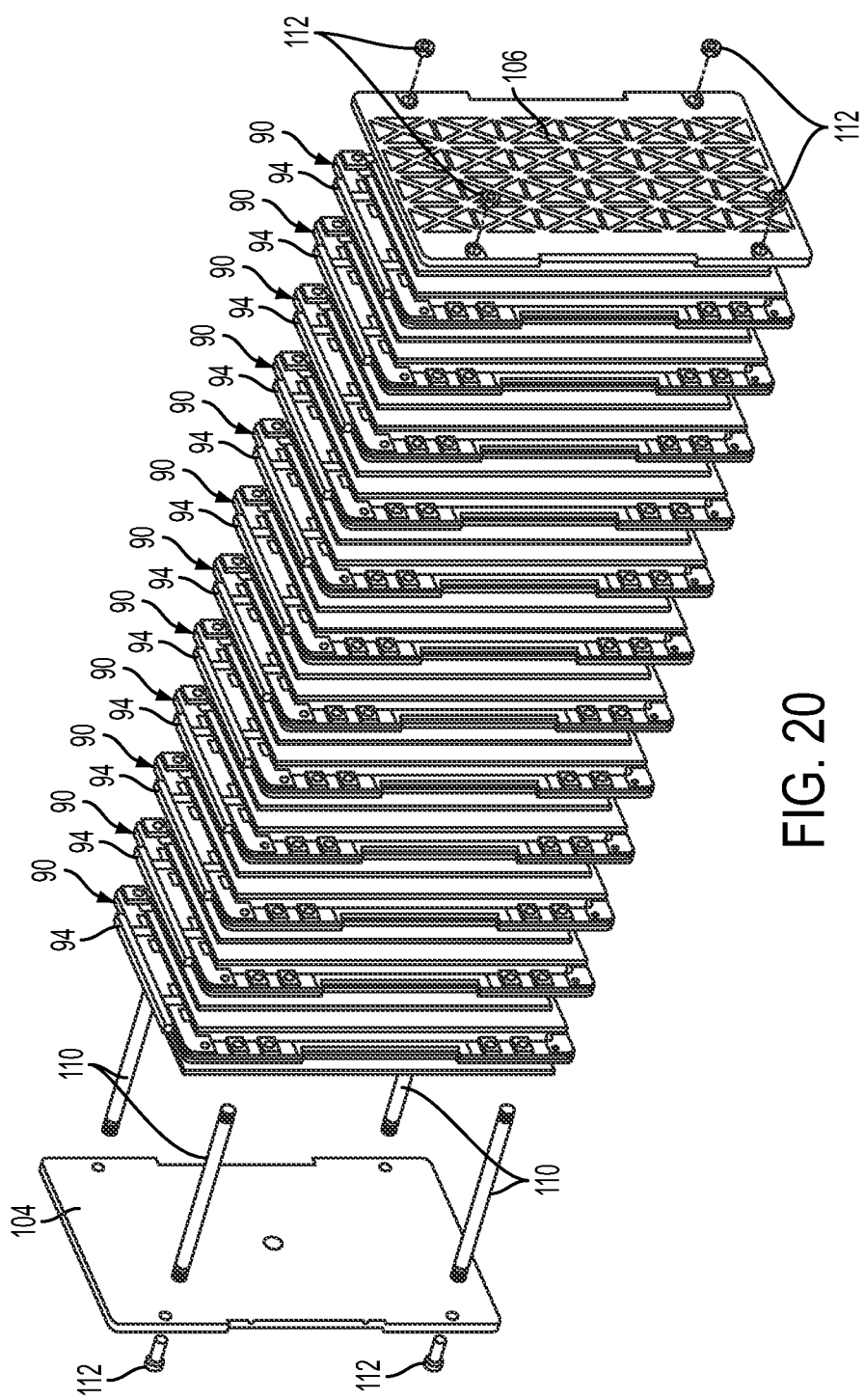
FIG. 20 is an exploded view of an alternate battery module.
Figure 21:
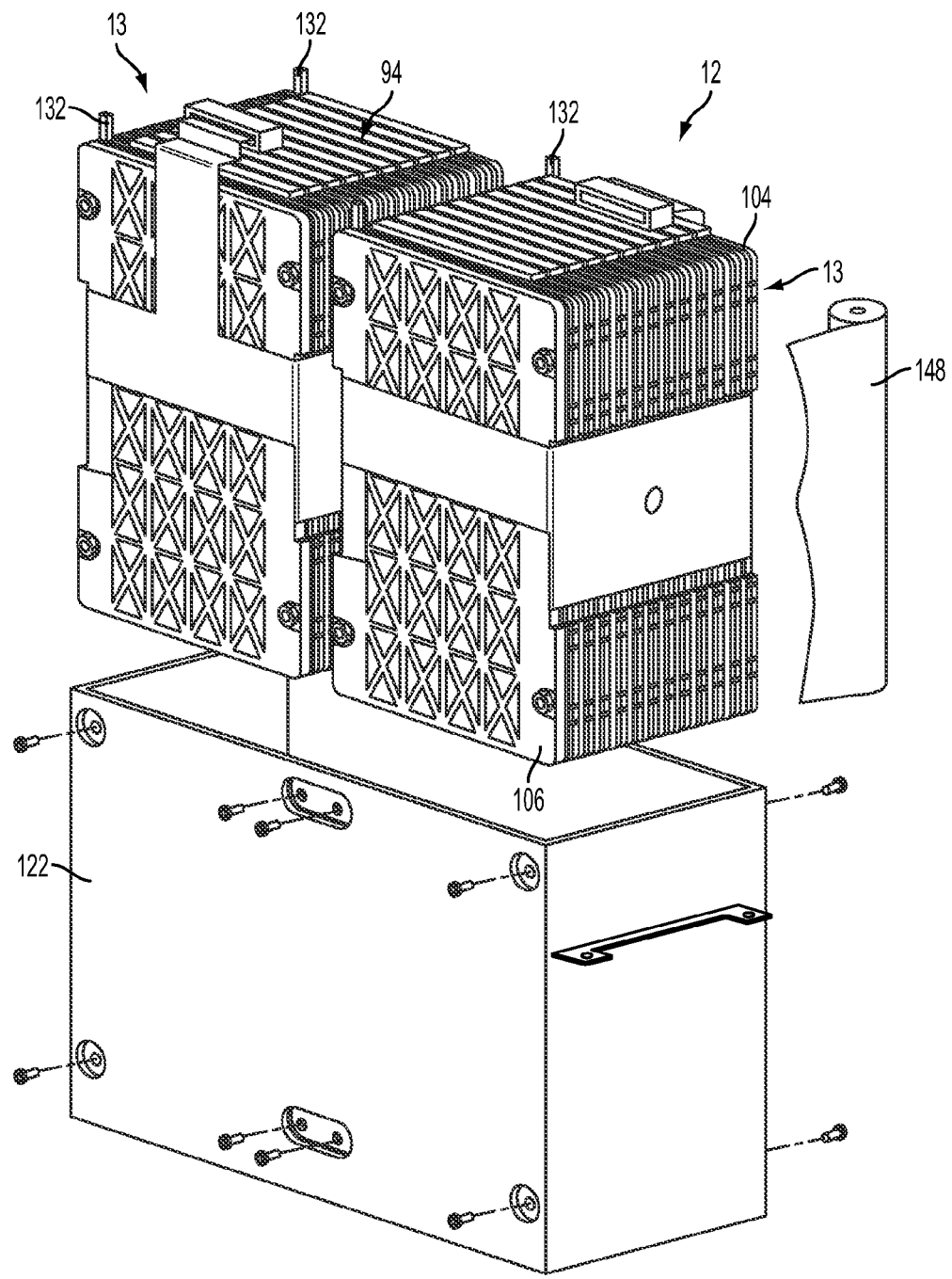
FIG. 21 is an exploded view of a portion of a battery sub-pack.

FIGS. 11-20 include various illustrations of portions of a module 13 and subcomponents thereof, generally shown at 13 in FIGS. 17 and 20-21. A thermally conductive plate, sheet, or foil 92 terminates to a first edge fin portion 94 presenting a corrugated configuration in the embodiment shown in FIGS. 11-17 and an open box configuration in the embodiment shown in FIGS. 18-21. FIG. 12 shows the second edge fin portion 95 being planar in the form of a bend to provide a thermal interface plane for an external heating or cooling device including but not limited to heater blankets and/or cooling jacket. Those skilled in the art will appreciate that numerous other shapes of the fin portion 94 can be utilized to provide better surface area for cooling or heating media, such as liquids, solids, or gasses, and the like, introduced in the fin portion 94 of each thermally conductive plate, sheet, or foil to either cool or to heat the cells of the battery module 13 of the sub-pack 12 without limiting the scope of the present disclosure.

Figures 14, 15:
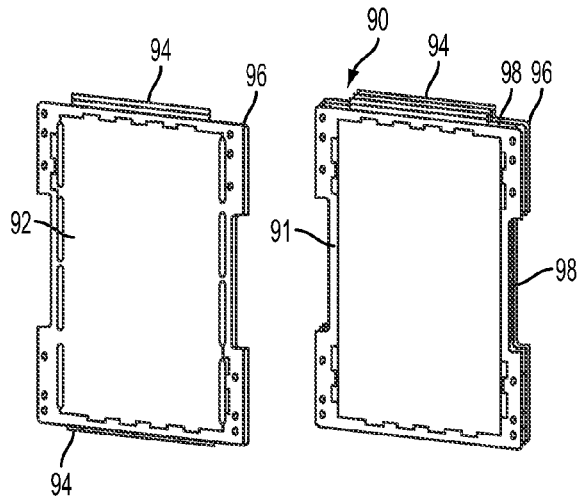
FIG. 14 is a perspective view of the heatsink element of FIGS. 11 and 12 held within two frame members of FIG. 13 to form a heatsink assembly.
FIG. 15 is a perspective view of a cells secured on opposite sides of the heatsink assembly of FIG. 14 by two frame members of FIG. 13 to form a cell assembly.

Alluding to the above, as shown, for example, in FIGS. 15 and 19, a cell assembly 90 includes two sets of frames 96 and 98. The first set of frames 96, as shown, for example, in FIGS. 14 and 18, presents a set of mechanical connections to secure the conductive plate, sheet, or foil 92 therebetween. The second set of frames 98 is used to secure the cells 91 attached to the opposite sides of the conductive plate, sheet, or foil 92.

As best illustrated in FIGS. 16, 17 and 20, a pair of compression plates, generally indicated at 104 and 106, are designed to form terminal walls of each battery module 13 of each sub-pack 12. A set of spaced holes 108 are defined in the compression plates 104 and 106 and also the cell assembly 90 to receive rods 110 extending through the compression plates 104 and 106 and the assembly 90 and are secured by fasteners 112 to apply pressure to the cells and to place the entire battery module 13 into a compressive state to promote a shorter path length for ionic conduction inside the cells 91 and improve heat transfer to the cell assemblies 90. Alternatively, each compression plate 104 and 106 presents male and female features (not shown) that engage and retain adjacent assemblies 90. A set of conical/countersink features may extend from the thermally conductive plate, sheet, or foil 92.

Figure 22:
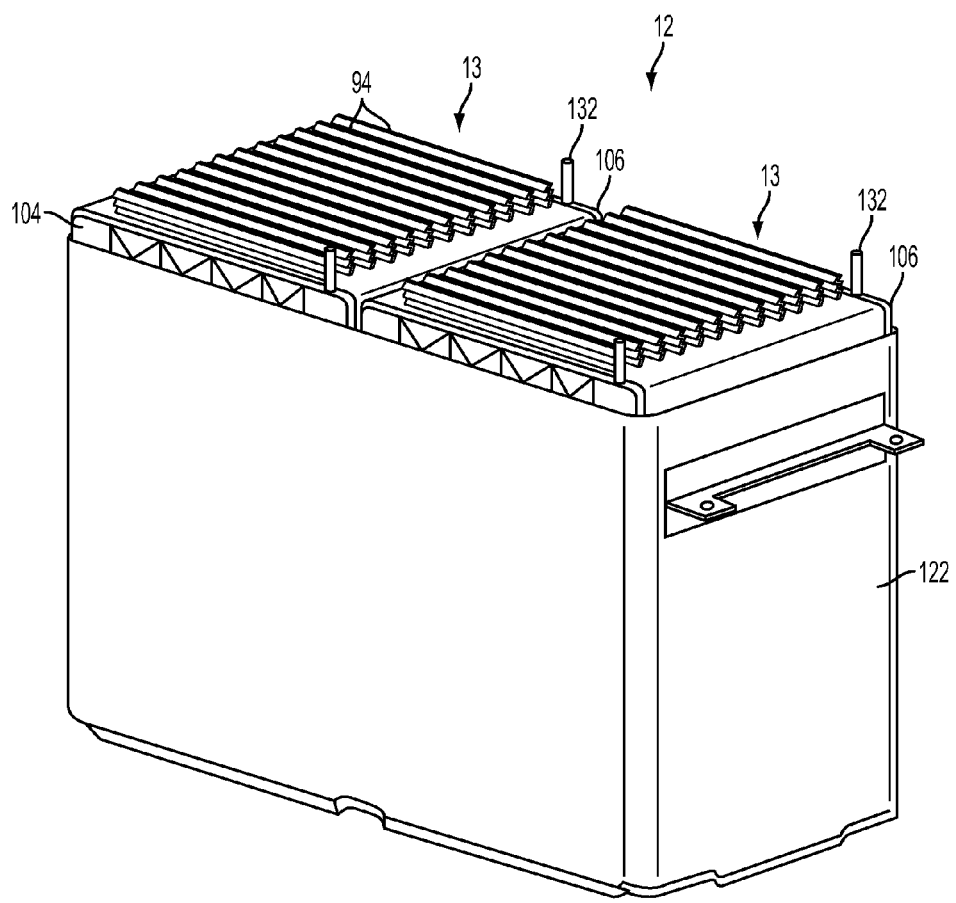
FIG. 22 is a perspective view of a portion of a battery sub-pack including a housing and two battery modules of FIG. 17.
Figure 23:
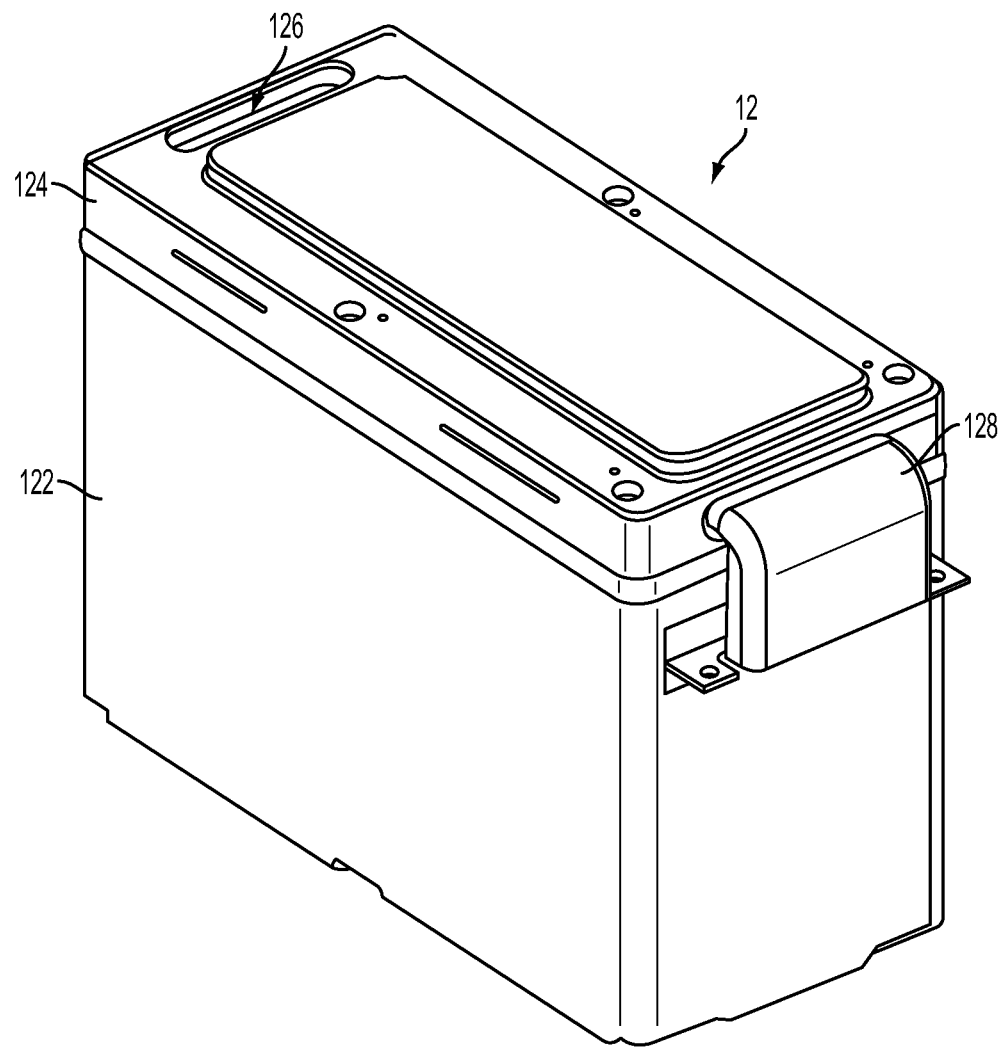
FIG. 23 is a perspective view of a battery sub-pack of FIG. 22 with a housing cover attached.

As best illustrated in FIGS. 21 and 22, two battery modules 13 are assembled into a sub-pack 12 and then placed into a sub-pack housing 122 and enclosed by a housing cover 124. The housing cover 124 includes a slot 126 exposed to the thermally conductive plate, sheet, or foil 92 and a tubular member 128 with each of them fluidly connected to the ports 60. The first locking elements 32 and the second locking elements 34, such as tongs, extending from the housing 122, as shown in FIGS. 4, 5 and 24. The housing 122 and the housing cover 124 are formed from a polymer material or non-polymer material or combination thereof without limiting the scope of the present disclosure.

During assembly, a blanket of material 148 is wrapped around portions of each assembled battery module 13 to form a wrap blanket 150 to allow for easy removal of the module 13 from potting material 152 disposed between the module and the housing 122. For example, a laminar flow of a mixed two-part encapsulating solution or potting material 152 is poured or otherwise introduced into the sub-pack housing 122 of the sub-pack 12. The abundance of surface area contact and excellent adhesion properties of the encapsulating solution to the wrap blanket partially encompassing each module 13 provides a significant mechanical advantage of retention versus traditional methods such as RTV. The expansion of the encapsulating solution also greatly enhances the structural integrity of the battery pack 10 with respect to shock, vibration, and crush loads. The encapsulating solution illustratively depicted in FIG. 25 at least partially encapsulates the battery module 13, reducing air gaps between the module 13 and the case or housing 122.

Figure 25:
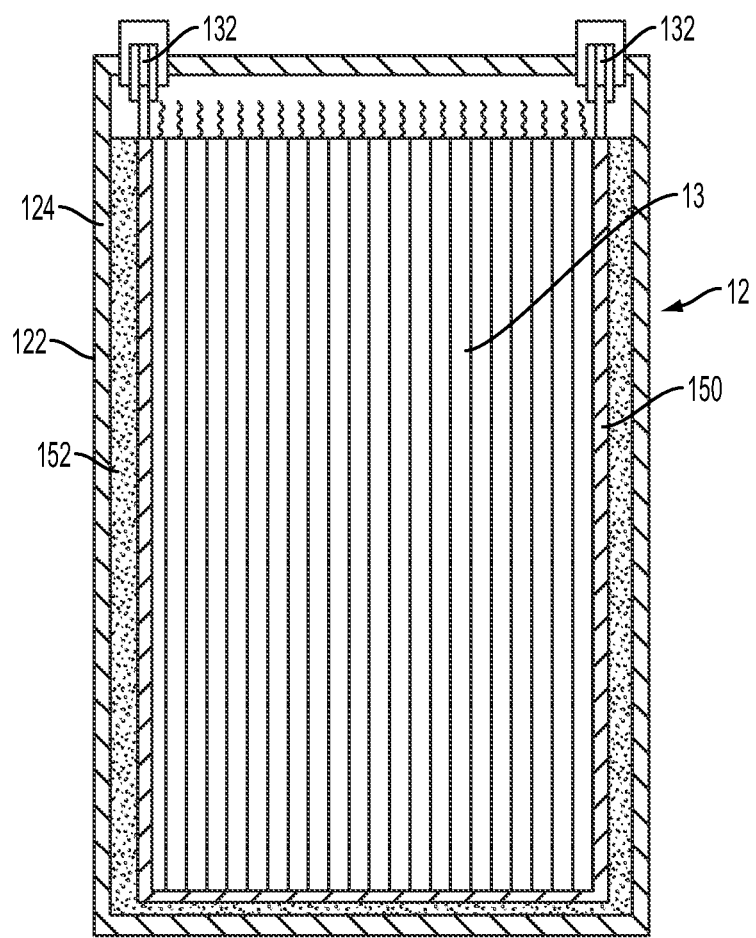
FIG. 25 is a sectional view of the sub-pack of FIG. 23 showing potting material received in the housing and a wrap blanket disposed between the potting material and the battery modules.

Heat transfer coefficients are improved due to the elimination of associated insulation layers created by dead air gaps. The encapsulating solution shot size would be controlled not to allow it to rise over the heat sink fin 94 configuration for air cooled applications as shown in FIG. 25. The encapsulating solution 152 also serves to prevent the electrode stack from shifting inside the cell packaging material during exposure to shock and vibration. The encapsulating solution 152 also prevents the cell packaging from relaxing over time and allowing the electrolyte to settle into the base of the cell package and thus reducing the cell 91 electrical capacity. In one embodiment, a wrap blanket 150 is formed from a polymeric material. Other materials that will inhibit the encapsulating material from adhering directly to the module 13 may be utilized within the scope of the disclosure. The wrap blanket 150 is disposed between the module 13 and the encapsulating solution 152 thereby providing "green" solution to allow the user to remove the module 13 from the sub-pack 12 and from the dish 14 and service the module 13 or simply to recycle the pack 10 or individual sub-packs 12 in a highly efficient fashion.

Figure 26:
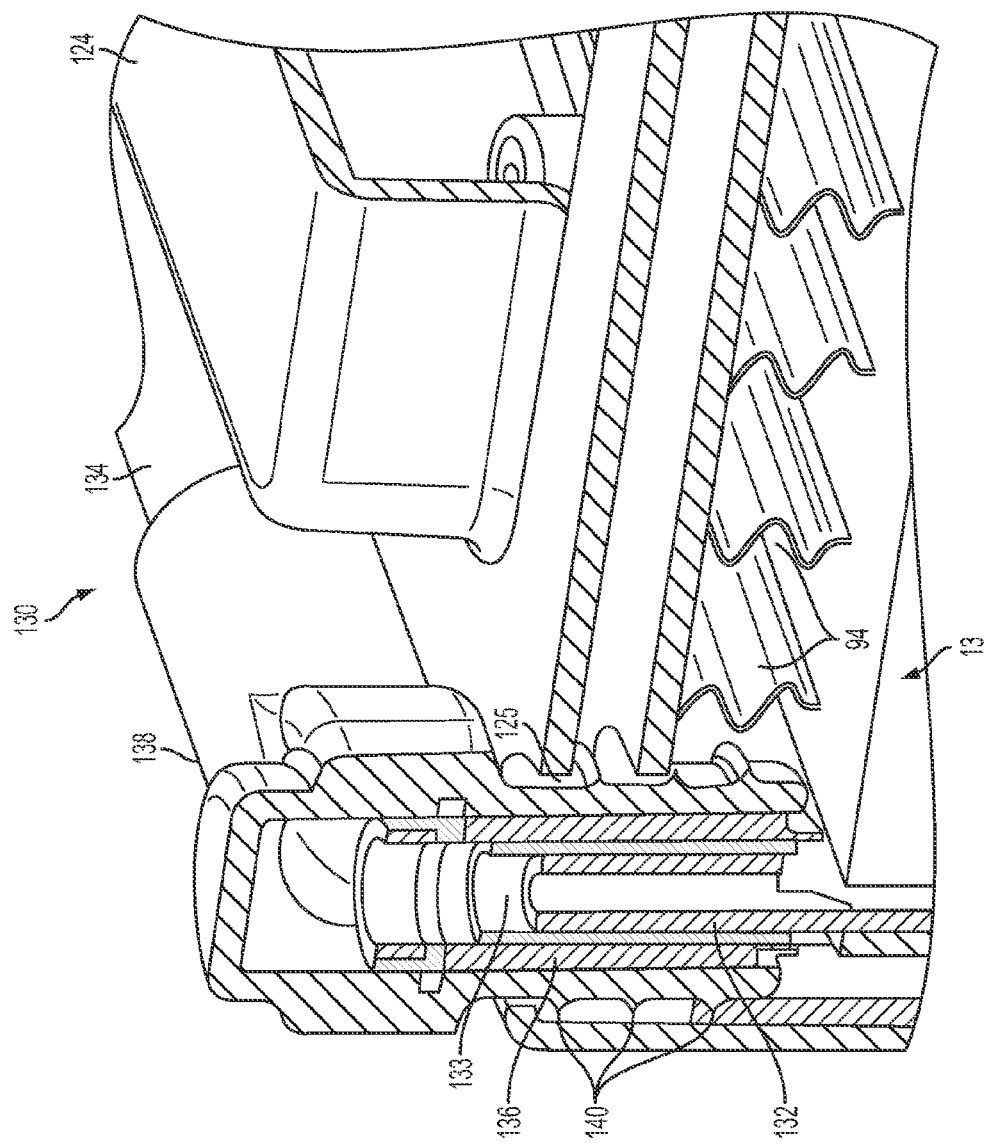

FIGS. 26-28 present a RADSOK assembly as generally shown at 130. Each module 13 of each sub-pack 12 includes a sub-pack terminal 132 to be cooperable with a cable 134. A RADSOK connector 136 presents a core member to securely connect the RADSOK connector 136 with the terminal 132. An over molded boot 138 formed from a polymeric material encapsulates the connector 136 and extends to the cable 134. A plurality of anti-pullout ribs 140 extend from the boot 138 to secure the cable 134 to the sub-pack terminal 132. Upon insertions, the ribs 140 collapse as they are inserted into an opening 125 extending through the housing cover 124.

The disclosed battery sub-pack 12 is configured so that the housing cover 124 is formed to include an opening 125 extending between an interior and an exterior of the housing. The battery module 13 received in the interior of the housing includes at least one sub-pack terminal 132 having a connector portion 133 configured to act as a first portion of a connector. The connector portion 133 of the sub-pack terminal 132 is disposed adjacent the opening 125 in the housing cover 124. The RADSOK connector 136 forms a second portion of the connector and is physically and electrically coupled to the cable 134. The RADSOK connector 136 is configured to cooperate with the connector portion 133 of the sub-pack terminal 132 to electrically couple the sub-pack terminal 132 to the cable 134.

The boot 138 encapsulates at least a portion of the RADSOK connector 136 and is formed at least in part from a resilient electrical insulating material. During insertion of the boot 138 into the opening 125, the ribs 140 move to permit the RADSOK connector 136 to extend through the opening 125 to be connected to the connector portion 133 of the sub-pack terminal 132. Upon connection of the RADSOK connector 136 to the connector portion 133, the ribs 140 of the boot 138 assume a configuration such that the boot 138 and the housing cooperate to inhibit physical disconnection of the RADSOK connector 136 from the connector portion 133.

The pack 10 includes a pre-charge circuit, a short circuit protection, a current sensor, a power connector, a pair of power contactors, and a pair of power buss bars extending from each module of each sub-pack 12 and connected to the respective power contactors. Alluding to the above, the battery pack 10 further includes temperature sensors (not shown) disposed within the housing for sensing the temperature of the cells. The temperature sensors are electrically connected to the flexible circuit that receives the temperature from the temperature sensors and routes the data to the battery controller circuits. If the temperature exceeds set safe limits, the battery controller will shut down the entire battery pack 10.

Those skilled in the art may appreciate that the battery pack 10 may include multiple temperature sensors and multiple control circuits. In addition, the arrangement of the cells, cooling devices, heaters, if required, the temperature sensors, and the control circuits may be different than as shown in the figures or described. Furthermore, one temperature sensor may be used with multiple control circuits, or each control circuit may have its own temperature sensor. Each may be controlled by the control circuit, or each heater, if required, may be controlled by separate control circuits.

One skilled in the art can appreciate that a lithium ion battery may only operate optimally within an ideal temperature range. When the ambient temperature is below 0° C., the performance of the cells 91 is greatly reduced. Therefore, the heater heats the battery module 13 to the optimal operating temperature, which allows the battery module 13 to be used when the ambient temperature is below 0° C. For instance, with the heater, the battery module may be used in ambient temperatures as low as −40° C. Those skilled in the art will appreciate that the temperatures referenced are merely given as an example. Alternatively, the heater may be replaced by a water jacket devices (not shown) for cooling the co-planar interface surface for introducing cooling agent such as for example liquid, gas, or solids and the like to the heat sink assembly thereby cooling the cells.

Alluding to the above other advantages of the present disclosure are shown. The battery pack 10 has very high energy density characteristics, wherein the high energy density is accomplished by assembling the cells, power and data bussing devices, the controllers, thermal management, and retention architecture in the small volume of space thereby improving packaging characteristics and providing a compact product. The battery pack 10 presents excellent retention methods that surrounds and secure the cells and present a cost effective design of the battery module 13 and sub-pack 12. Another advantage of the present disclosure provides the battery module 13 is at least partially encapsulated by the potting material 152, which greatly reduces the potential permeation of liquids into the battery module 13, or leakage from inside the battery packs 10 to the outside of the battery pack 10 thereby preventing reduced product life or premature failures of the battery pack 10.

The disclosed battery pack provides other advantages over the prior art. The battery pack 10 has efficient packaging characteristics, which provide an excellent retention method that surrounds and secures the cells 91, and the internal electrode stacks within the cells. Another advantage is the unique design of the battery pack 10 that provides improved adhesion and surface area contact between the blanket wrapped module and the housing of the battery sub-pack 12 and the encapsulant disposed therebetween and material density thereby providing the battery pack 10 with the structural integrity being superior to prior art battery packs using traditional retention methods. Still another advantage of the disclosed battery pack 10 is that the battery pack 10 has a chemical resistant design wherein the internal components of the battery pack 10 are encapsulated by the potting material 152 which greatly reduces the potential permeation of liquids into the battery pack 10, or leakage from inside the battery pack 10 to the outside of the battery pack 10 thereby preventing reduced product life or premature failures of the battery pack 10.

While the invention has been described as an example embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery pack assembly for a vehicle having a device for introducing fluid therein thereby affecting temperature of said battery assembly, said battery assembly presenting at least one battery sub-pack comprising:

a battery module including a plurality of prismatic cells having side edges and a plurality of heat transfer elements extending between said prismatic cells with each heat transfer element presenting terminal ends and thermal transfer edges with at least one of said thermal transfer edges extending beyond said side edges of said prismatic cell with said heat transfer elements and said prismatic cells being removable interconnected with one another thereby applying pressure to said prismatic cells;

a case in which the battery module is received;

a potting material disposed in the case to at least partially encapsulate the battery module; and a blanket material encompassing the battery module to the extent necessary to be disposed between the potting material and the battery module, wherein the blanket material adheres to the potting material and maintains a separation between the potting material and the battery module resulting in the battery module being removable from the potting material.

2. The assembly of claim 1 wherein the potting material fully encapsulates portions of the module not including the thermal transfer edges extending beyond the edges of the prismatic cell and the blanket material is spaced apart from the thermal transfer edges.

3. The assembly of claim 1 wherein the potting material is selected from the group of, polyurethane, polyurethane foams, silicones and epoxies.

4. The assembly of claim 1 wherein the potting material is disposed in the case so as to substantially reduce air gaps between the module and the case.

5. The assembly of claim 1 wherein each cell includes electrodes, electrolyte and cell packaging and the potting material is disposed in the case so as to substantially prevent the cell packaging from relaxing over time.

6. The assembly of claim 5 wherein the potting material is disposed in the case so as to substantially prevent the electrolyte from settling within the cell packaging.

7. The assembly of claim 5 wherein the potting material is disposed in the case so as to substantially prevent movement of the module within the case.

8. The assembly of claim 1, wherein the thermal transfer edges extend above a top level of the potting material.

9. The assembly of claim 1, the battery module includes a terminal, wherein the terminal extends above a top level of the potting material.

10. The assembly of claim 1, wherein the blanket material is spaced apart from the case by the potting material.

11. The assembly of claim 1, wherein the blanket material covers a first side of the battery module and a second side of the battery module, a top of the battery module being uncovered by the blanket material.

12. The assembly of claim 11, wherein the blanket material covers a bottom of the battery module.

13. The assembly of claim 12, wherein the blanket material is spaced apart from the case by the potting material.

14. The assembly of claim 12, wherein the potting material covers the first side of the battery module, the second side of the battery module, and the bottom of the battery module, the top of the battery module being uncovered by the potting material.

15. The assembly of claim 11, wherein the potting material covers the first side of the battery module and the second side of the battery module, the top of the battery module being uncovered by the potting material.

\* \* \* \* \*